(12) United States Patent
Rayman

(10) Patent No.: US 12,507,770 B2
(45) Date of Patent: Dec. 30, 2025

(54) SWIMWEAR JEWELRY

(71) Applicant: Raye Rocks LLC, Coral Gables, FL (US)

(72) Inventor: Erika Rayman, Coral Gables, FL (US)

(73) Assignee: Raye Rocks LLC, Coral Gables, FL (US)

( * ) Notice: Subject to any disclaimer, the term of this patent is extended or adjusted under 35 U.S.C. 154(b) by 0 days.

(21) Appl. No.: 18/235,798

(22) Filed: Aug. 18, 2023

(65) Prior Publication Data
US 2025/0057291 A1 Feb. 20, 2025

(51) Int. Cl.
*A44C 15/00* (2006.01)

(52) U.S. Cl.
CPC .................... *A44C 15/00* (2013.01)

(58) Field of Classification Search
CPC .......... A44C 15/00; A44C 13/00; A44C 5/18; A44C 5/185; A44C 5/2057; A44C 5/2061; F16B 45/037; F16B 45/06; F16B 45/02; F16B 45/023; F16B 45/024; F16B 45/035; F16B 45/059; F16B 245/057; F16B 45/026; Y10T 24/3431; Y10T 24/3432; Y10T 24/3433; Y10T 24/3435; Y10T 24/3436; Y10T 24/3443; Y10T 24/4098; Y10T 24/45016; Y10T 24/45063; Y10T 24/45037; Y10T 24/45188; Y10T 24/45209
USPC ................ 294/82.18; 24/905; D11/208, 216
See application file for complete search history.

(56) References Cited

U.S. PATENT DOCUMENTS

| | | | | |
|---|---|---|---|---|
| 8,715 | A * | 2/1852 | Arrowsmith | F16B 45/026 59/80 |
| 4,000,627 | A * | 1/1977 | Wahlbeck | A44C 5/185 63/3.1 |
| 5,634,246 | A * | 6/1997 | Jermyn, Jr. | F16B 45/029 24/601.5 |
| 6,138,356 | A * | 10/2000 | Hertelendy | A44C 15/00 63/4 |
| D498,175 | S * | 11/2004 | Ledein | D11/218 |
| D500,669 | S * | 1/2005 | Kelleghan | D8/356 |
| D527,245 | S * | 8/2006 | Kelleghan | D8/356 |
| 7,125,186 | B1 * | 10/2006 | Stokes | B43K 7/005 401/6 |
| D534,416 | S * | 1/2007 | Kelleghan | D8/356 |
| D536,280 | S * | 2/2007 | Wemmer | D11/218 |
| D562,383 | S * | 2/2008 | Stokes | D19/904 |
| 7,350,376 | B2 * | 4/2008 | Couling | A44C 5/2095 63/3 |
| 8,875,965 | B2 * | 11/2014 | Corets | B60R 7/043 224/666 |

(Continued)

FOREIGN PATENT DOCUMENTS

GB 2210248 A * 6/1989 ............. A44C 5/185

*Primary Examiner* — Jack W Lavinder
(74) *Attorney, Agent, or Firm* — Thomas C. Meyers; Sullivan & Worcester LLP

(57) ABSTRACT

An item of bikini jewelry includes a pair of pivotally coupled rings attached in a figure eight configuration, where the rings swivel with respect to each other. Each ring includes a manually operable clasp for attaching at least one of the rings to part of an article. A smaller one of the rings has a circular profile while the larger one has an elliptical profile. The larger elliptical ring may include a studded outer surface and a finger latch for opening or closing the clasp.

20 Claims, 31 Drawing Sheets

(56) References Cited

U.S. PATENT DOCUMENTS

| | | | | |
|---|---|---|---|---|
| D935,305 S | * | 11/2021 | Gong | D8/356 |
| 2006/0107499 A1 | * | 5/2006 | Wu | F16B 45/027 |
| | | | | 24/600.6 |
| 2009/0013721 A1 | * | 1/2009 | Murao | A44C 5/2038 |
| | | | | 63/3.1 |
| 2015/0181987 A1 | * | 7/2015 | Micheli | A44C 5/2033 |
| | | | | 24/574.1 |
| 2021/0085040 A1 | * | 3/2021 | Bixby | A44C 25/001 |

\* cited by examiner

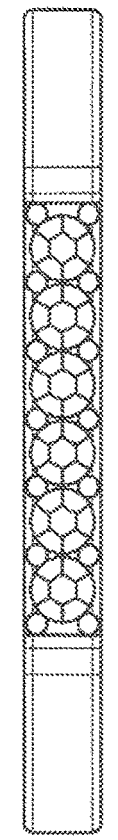
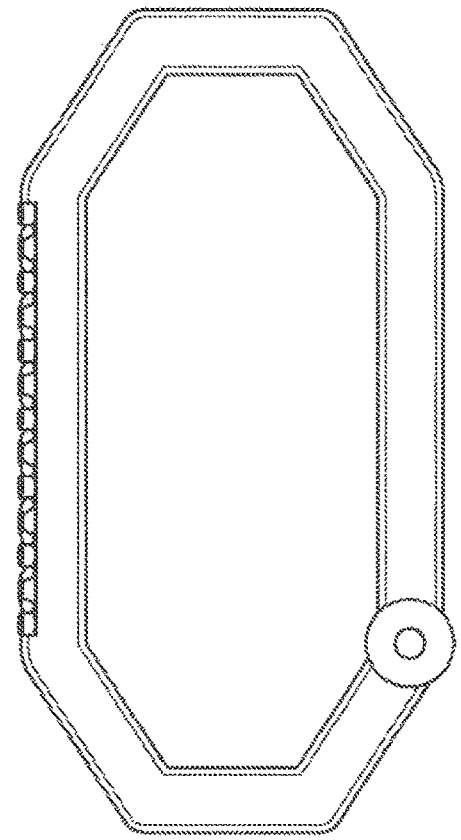
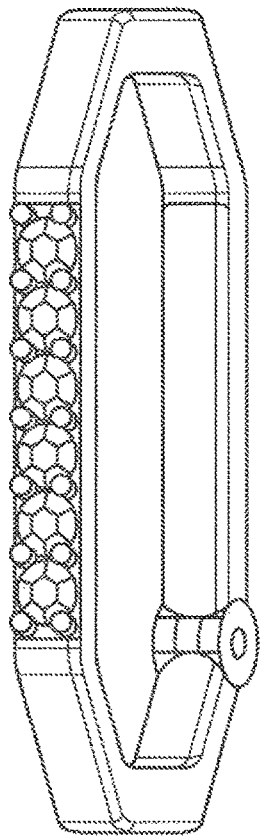
FIG. 44
FIG. 45
FIG. 46

SWIMWEAR JEWELRY

FIELD OF THE INVENTION

The present invention generally relates to jewelry. Specifically, the present invention relates to bikini jewelry.

BACKGROUND

The origins of the bikini are said to go as far back as ancient Rome. A large-scale depiction of women exercising in two-piece garments that resemble a bikini can be found at the Mosaics at Villa Romana del Casale in Sicily, Italy which dates back to the fourth century. However, the modern-day bikini did not appear on the scene until the mid 1940s and is generally attributed to Louis Reard who named the bikini after the Bikini Atoll, a nuclear test site near Guam. Initially, there was some public outcry over the perceived immodesty of the bikini with Pope Pious XII deriding it as "sinful." However, as public sensibilities changed in the 60s and beyond, the bikini became more acceptable and its use more widespread. The bikini was largely popularized by celebrities like Brigitte Bardot and actress Ursula Andress who sported an iconic white bikini in the James Bond movie "Dr. No."

The basic design of the bikini has remained fairly consistent over the years. Different styles of bikinis have come and gone as depicted in the many Sports Illustrated swimsuit issues. However, bikini accessories such as ornamental jewelry would enhance the look and style of a bikini by allowing the wearer to creatively adorn their bikini with specially designed bikini jewelry that is waterproof and resistant to damage caused by salt, chlorine, sand, and wind.

BRIEF SUMMARY

In one aspect, swimwear jewelry includes a pair of pivotally coupled rings. Each ring includes a manually operable clasp for attaching at least one of the rings to an article, such as a bikini. A smaller one of the rings has a circular profile and the larger ring has an elliptical profile. The two rings are secured to each other via a pivot mechanism that couples the two rings together while allowing swivel action between them. The larger elliptical ring may also include a studded outer surface.

The studded outer surface may include two peripheral tracks of spherical studs flanking an inner track of Tic-Tac® shaped studs. In this embodiment, the circular ring may be pivotally attached to the elliptical ring through one of the Tic-Tac® shaped studs.

The elliptical ring clasp may include a finger latch for opening the clasp. In one embodiment, the finger latch is tripartite finger latch that provides more surface area for a user's finger to contact, making it easier to open the clasp.

The swimwear jewelry may be composed of one or more different materials, such as metal, (e.g., gold, silver, platinum, palladium, titanium, tungsten, and stainless steel), crystal, diamond, gemstone, or any combination thereof. According to one embodiment, the composition is approximately 33.6% gold, 22.6% silver, and 43.7% platinum.

The swimwear jewelry may include a pivot mechanism having a post extending from the circular ring and through an opening in an outer surface of the elliptical ring. A retention donut is dimensioned to receive the post extending through an inner surface of the elliptical ring, and is configured to anchor the post to the inner surface of the elliptical ring. The inner surface of the elliptical ring defines a recessed pocket dimensioned to receive the retention donut and the retention donut is securely seated in the pocket.

The swimsuit jewelry is both attractive and versatile in that it can connect with other similar pieces of jewelry to form decorative designs on an article of swimwear. In addition, the swimwear jewelry is designed to be water resistant, corrosion resistant, light weight, strong, and lustrous.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 44-46 illustrate top, side and perspective views, respectively, of a swimsuit jewelry connector in accordance with an embodiment of the present invention.

DETAILED DESCRIPTION

Figure 1:
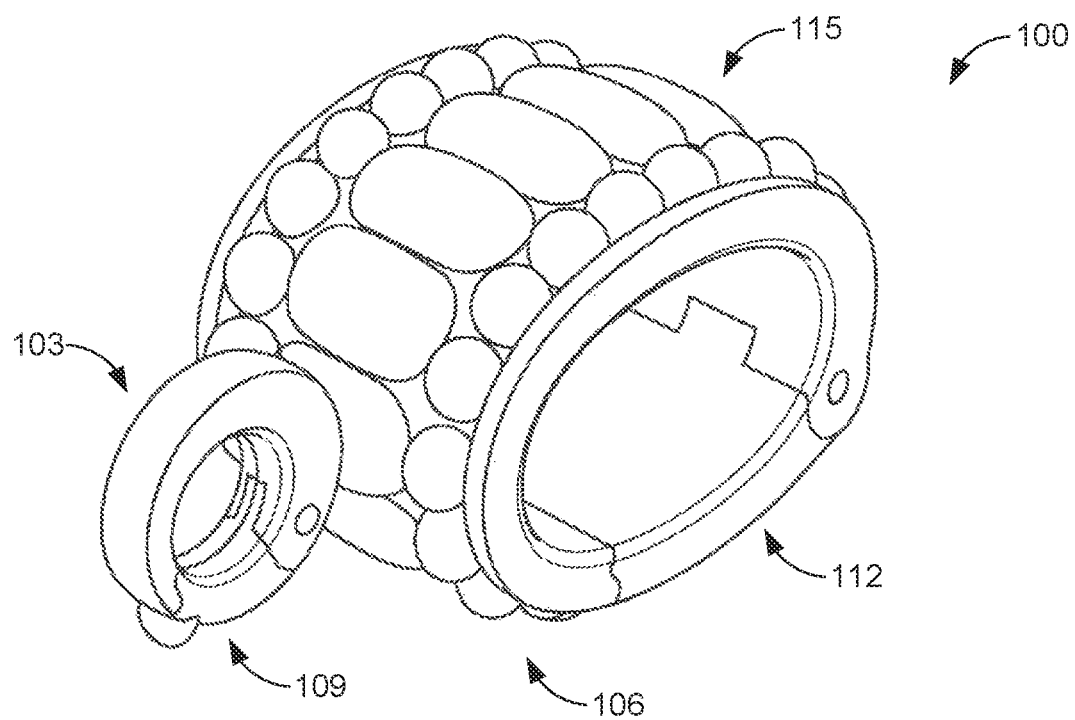
FIG. 1 illustrates a perspective view of the swimsuit jewelry in accordance with an embodiment of the present invention.

According to an embodiment of the invention, an item of bikini jewelry includes a pair of pivotally coupled rings. Each ring includes a manually operable clasp for attaching at least one of the rings to an article, such as a bikini. For example, the bikini jewelry may be attached to part of a bikini, such as a bikini loop, strap, string, button, hole, zipper, or any other item hanging from the bikini. A smaller one of the rings has a circular profile and the larger ring has an elliptical profile. The size of the rings may be defined in terms of circumference, radius, diameter, area, or surface area. However, one or ordinary skill in the art will appreciate that the two rings can have the same size, same shape, different size, or different shape.

In addition, the manually operable clasp described herein may include a spring loaded or simple (i.e., non-spring loaded) hinged gate for opening or closing the gate as is well known in the art. Types of clasps that may be used with the present invention include a ball clasp, barrel clasp, box clasp, fishhook clasp, hook clasp, lobster clasp, ladder clasp, push button clasp, springring clasp, buckle clasp, concealed clasp, ladder clasp, swivel clasp, slide clasp, magnetic clasp, toggle clasp, or any other type of clasp known in the art.

According to one embodiment, the elliptical ring has an inner surface and a studded outer surface. The studded outer surface may include two peripheral tracks of spherical studs flanking an inner track of Tic-Tac® shaped studs. However, the shapes of the studs are not intended to be limiting and any other shapes are possible. Further, the studded outer surface may include the peripheral tracks without the inner tracks, or the inner track without the peripheral tracks.

As mentioned above, the circular ring is pivotally attached to the elliptical ring. In one embodiment, the pivotal attachment is made through one of the Tic-Tac® shaped studs. Specifically, the circular ring includes a post that extends through an opening in the Tic-Tac® shaped stud and through the elliptical ring surface to an opposite side (i.e., the inner side) surface of the elliptical ring. A retention donut, such as a donut washer, may be used to anchor the post to the inner side of the elliptical ring. Moreover, the post may extend through an opening in the elliptical ring surface that is not a Tic-Tac® shaped stud, such as a non-studded surface of the elliptical ring.

The retention donut may further be configured to allow rotational movement of the post while restraining longitudinal movement. This may be accomplished by using a retention donut made of a material with a high coefficient of friction such as a rubber material. Alternatively, the retention donut may include internal threading that mates with corresponding threading on the post, allowing the post to freely rotate clockwise or counterclockwise, but not advance or retract in a longitudinal direction. The retention donut can be any material including metal, rubber, plastic, silicone, wood, or any other suitable material.

The inner surface of the elliptical ring may also include a recessed pocket dimensioned to receive the retention donut. The retention donut is seated in the recessed pocket and fits snugly therein, reducing the overall profile of the bikini jewelry item and helping to create a sleek appearance.

According to an exemplary embodiment, both the circular ring and the elliptical ring clasps each comprise a finger latch for opening the clasp. The elliptical and/or circular ring clasp may include a tripartite finger latch providing more surface area for a finger to contact which in turn makes it easier to open the clasp. However, any other type of finger latch that allows a user's finger to open a clasp may be used.

The bikini jewelry may be composed of various constituent metals, such as gold, silver, and platinum. In one embodiment the proportions of each metal are approximately 33.6% gold (18 kt), 22.6% silver, and 43.7% platinum. In another exemplary embodiment, the proportions of each metal are 31.4% gold (14 kt), 23.3% silver, and 45.2% platinum. These preferred proportions provide an alloy that is more corrosion resistant, lustrous, attractive, and resilient. However, other proportions of these metals or other metals may be used to create the bikini jewelry.

According to another embodiment, an item of bikini jewelry includes a circular ring with a manually operable clasp for attaching at least one of the rings to part of a bikini or to any item hanging from the bikini. An arch shaped hook extends from one peripheral edge of the ring to an opposite peripheral edge thereof. The arch shaped hook may be used to link the bikini jewelry with other pieces of bikini jewelry, such as any of the embodiments described herein, or may be used as an attachment point for a strap, cord, tie, etc. that may be passed through or tied around the hook.

The elliptical ring comprises a studded outer surface which may include two peripheral tracks of spherical studs flanking an inner track of Tic-Tac® shaped studs. However, one of ordinary skill will appreciate that differently shaped studs may be used for the peripheral tracks and the inner track. Further, the studded outer surface may include the peripheral tracks without the inner tracks, or the inner track without the peripheral tracks.

Turning to the figures, FIG. 1 illustrates an item of bikini jewelry 100 having two pivotally attached rings. The smaller ring 103 has a circular profile, while the larger ring 106 as an elliptical profile. Both rings feature a manually operated clasp 109 and 112 allowing either or both rings to be attached to part(s) of an article such as a bikini. An outer surface of the elliptical ring includes studded tracks 115, specifically, two peripheral tracks of spherical studs flanking a central or inner track of Tic-Tac® shaped studs. However, one of ordinary skill will appreciate that one or more of these tracks may include different shapes or may be missing entirely.

Figure 2:
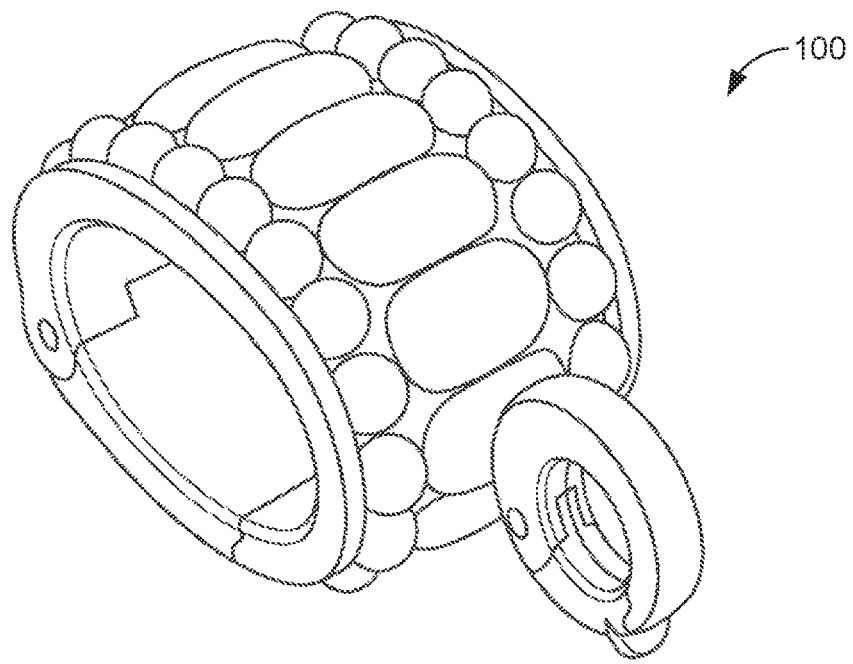
FIG. 2 illustrates a perspective view of the swimsuit jewelry in accordance with an embodiment of the present invention.
Figure 3:
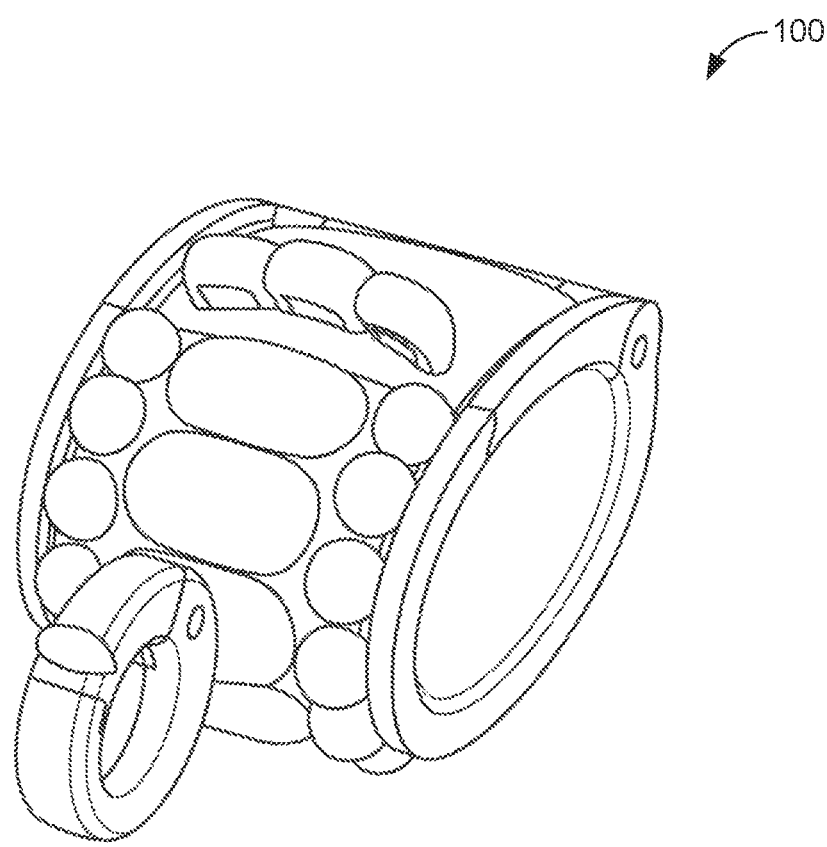
FIG. 3 illustrates a perspective view of the swimsuit jewelry in accordance with an embodiment of the present invention.

FIGS. 2 and 3 show different orientations of the bikini jewelry 100 of FIG. 1.

Figure 4:
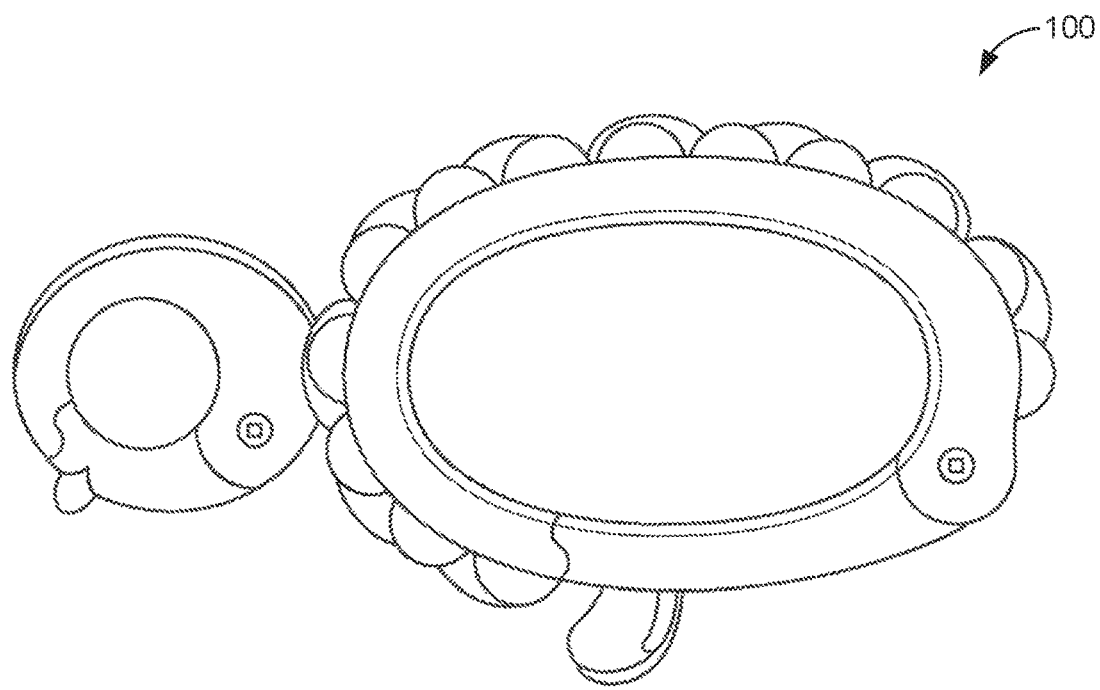
FIG. 4 illustrates a side elevation view of the swimsuit jewelry in accordance with an embodiment of the present invention.

FIG. 4 illustrates a side view of the bikini jewelry 100 of FIG. 1 with some preferred dimensions. However, the dimensions shown are not intended to be limiting and any other dimensions may be utilized.

Figure 5:
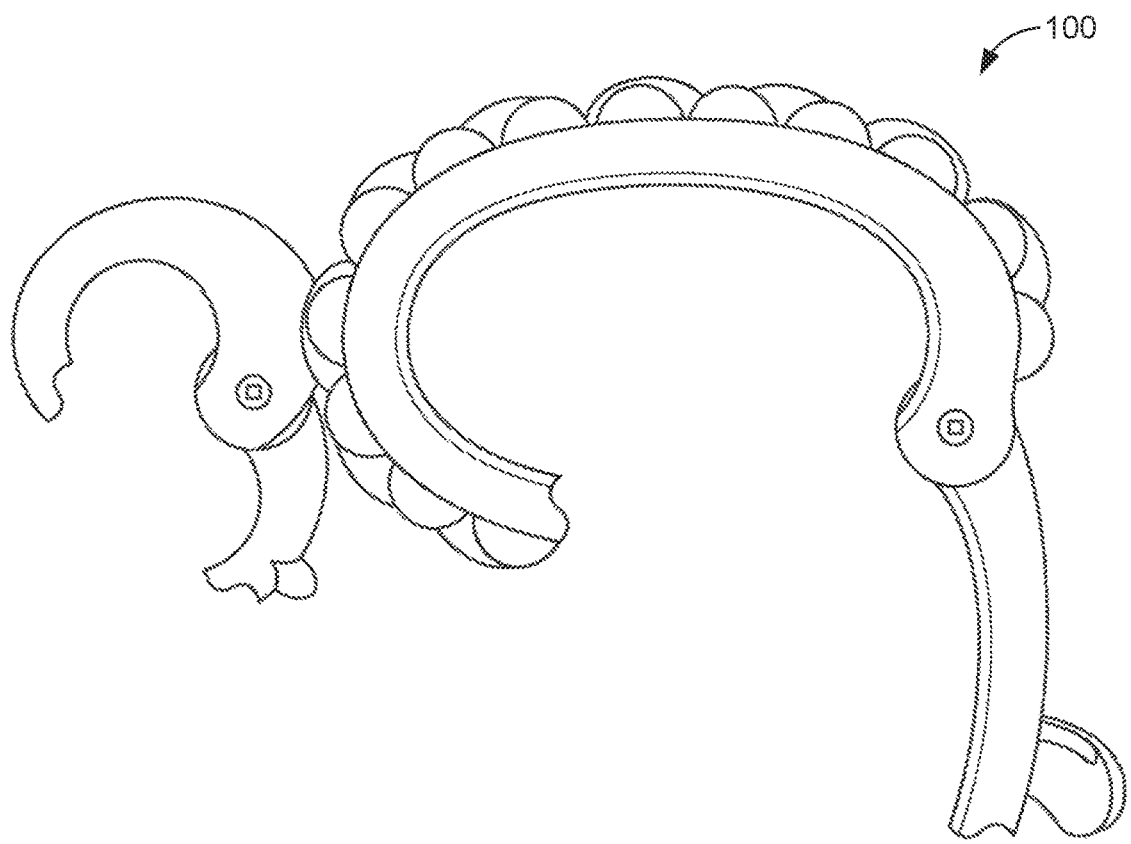
FIG. 5 illustrates a side elevation view of the swimsuit jewelry with open clasps in accordance with an embodiment of the present invention.

FIG. 5 shows the bikini jewelry 100 of FIG. 4 with the clasps in an open position. Once again, some dimensions are shown with respect to the clasps in their open position, but other dimensions may be used without departing from the spirit of the invention.

Figure 6:
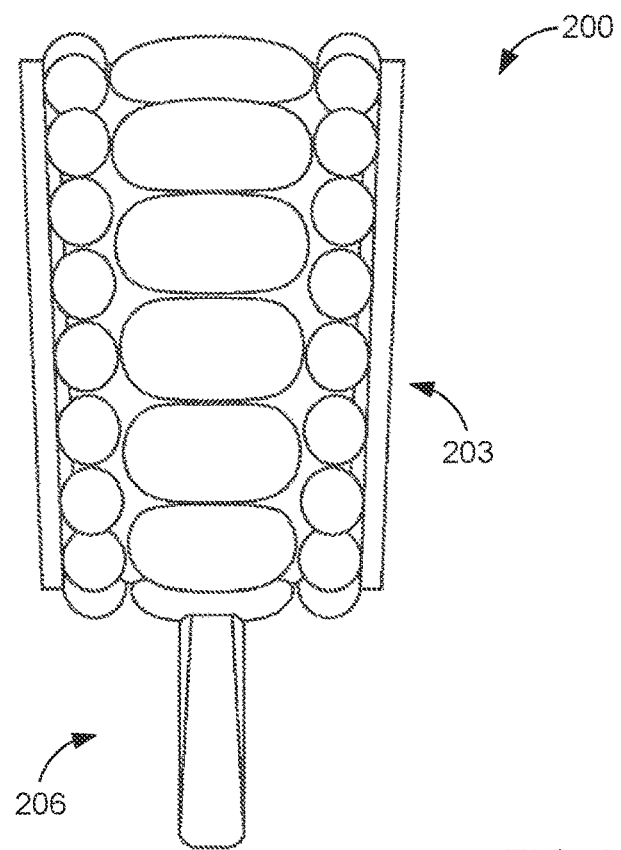
FIG. 6 illustrates a top plan view of the swimsuit jewelry in accordance with an embodiment of the present invention.

FIG. 6 illustrates a top view of the bikini jewelry 200 showing the larger elliptical ring 203 with its studded outer surface connected to the smaller circular ring 206. As can be seen, the elliptical ring 203 may have a variable width that narrows along one segment of the ring 203 and widens along another segment. Although some preferred dimensions are illustrated, these dimensions are intended to be nonlimiting and any other dimensions may be used.

Figure 7:
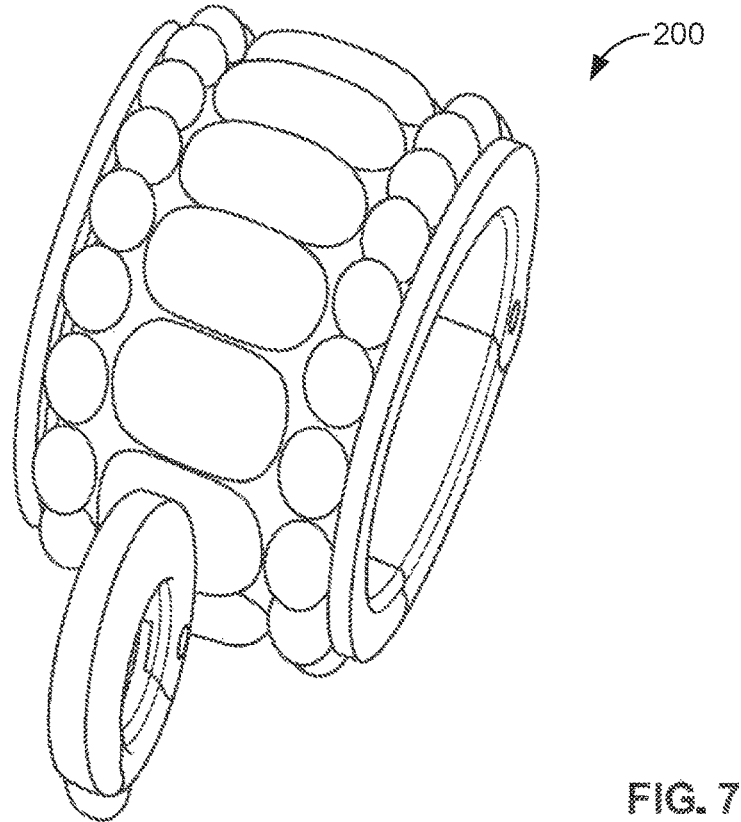
FIG. 7 illustrates a perspective view of the swimsuit jewelry in accordance with an embodiment of the present invention.

FIG. 7 shows a perspective view of the bikini jewelry 200 and a chart indicating some preferred constituent metal weights of the bikini jewelry in its different forms (i.e., normal, post-process, and post-mold).

Figure 8:
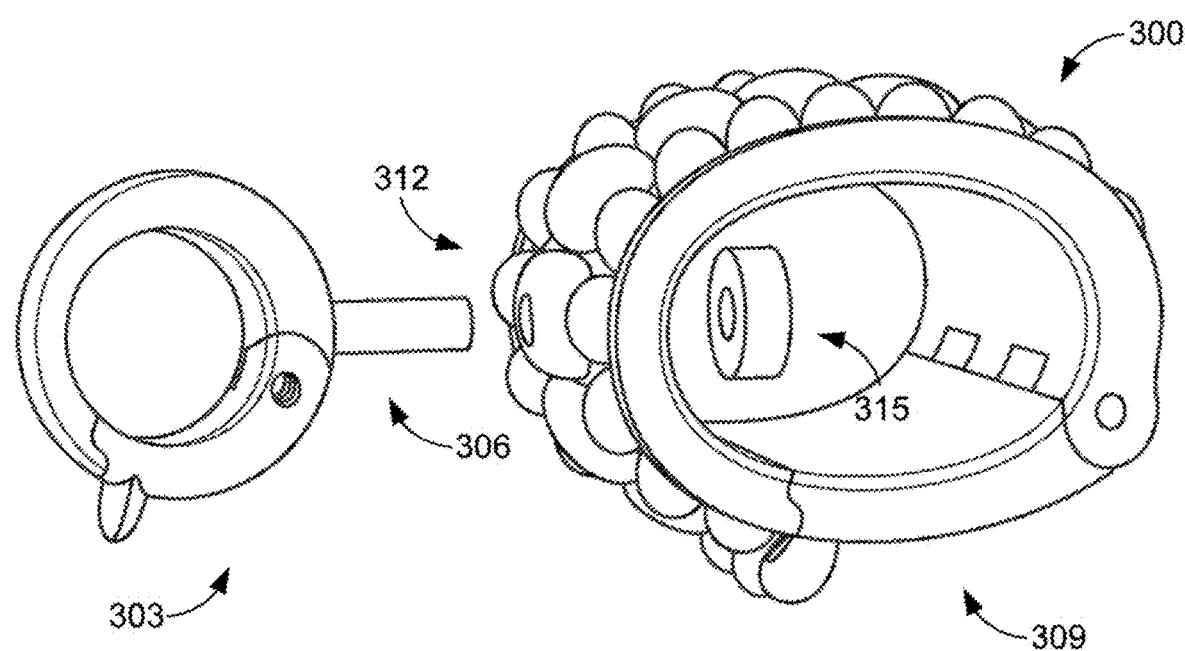
FIG. 8 illustrates an exploded view of the swimsuit jewelry in accordance with an embodiment of the present invention.

FIG. 8 illustrates an exploded side view of the bikini jewelry 300 showing the smaller circular ring 303, a post 306 extending from the circular ring 303, the larger elliptical ring 309 with an opening 312 dimensioned to receive the post 306, and a retention donut 315 to anchor the circular ring 303 to the elliptical ring 309 while allowing swivel action between the two rings. In the embodiment shown in FIG. 8 the opening 312 for receiving the post 306 is a passage through one of the Tic-Tac® shaped studs on the elliptical ring 309. However, one of ordinary skill will appreciate that the opening or passage through the elliptical ring 309 surface can appear on a different part of the elliptical ring 309, such as a non-studded area of the ring surface.

Figure 9:
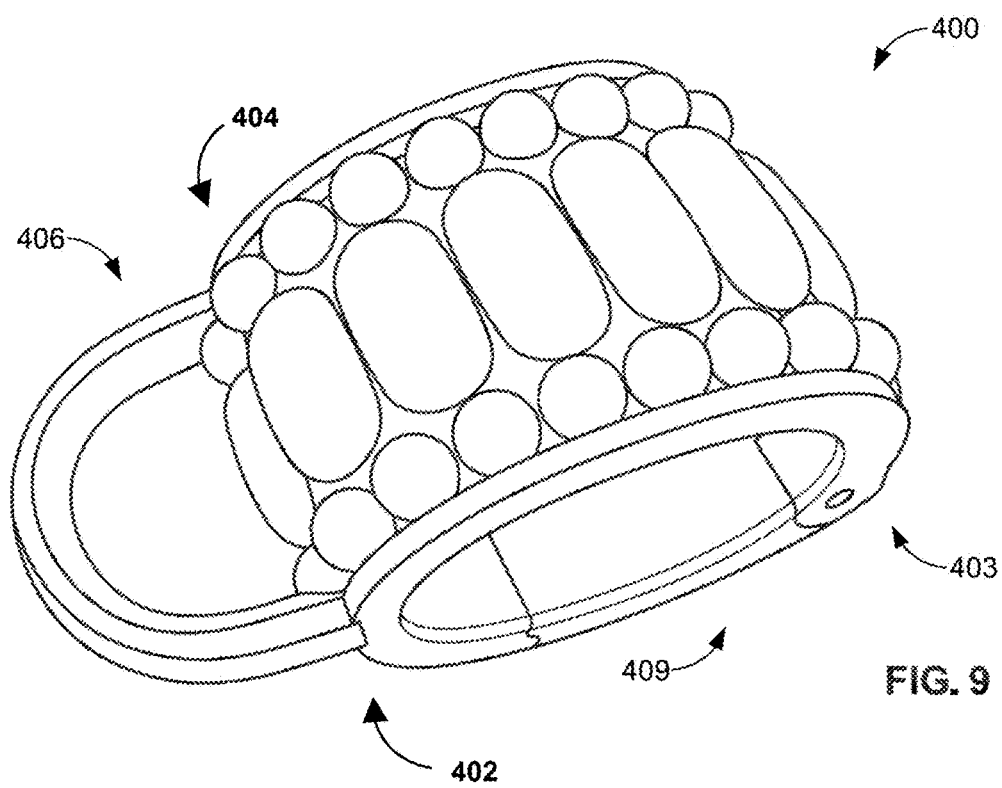
FIG. 9 illustrates a perspective view of the swimsuit jewelry in accordance with an embodiment of the present invention.

FIG. 9 illustrates another embodiment of the bikini jewelry 400. In this embodiment, a circular ring 403 with the same type of studded surface described above is provided. The circular ring 403 includes an arch shaped hook 406 that extends from one peripheral edge 402 of the ring 403 to an opposite peripheral edge 404. The ring 403 also includes a clasp 409 for attaching the ring to part of an article, such as a bikini.

Figure 10:
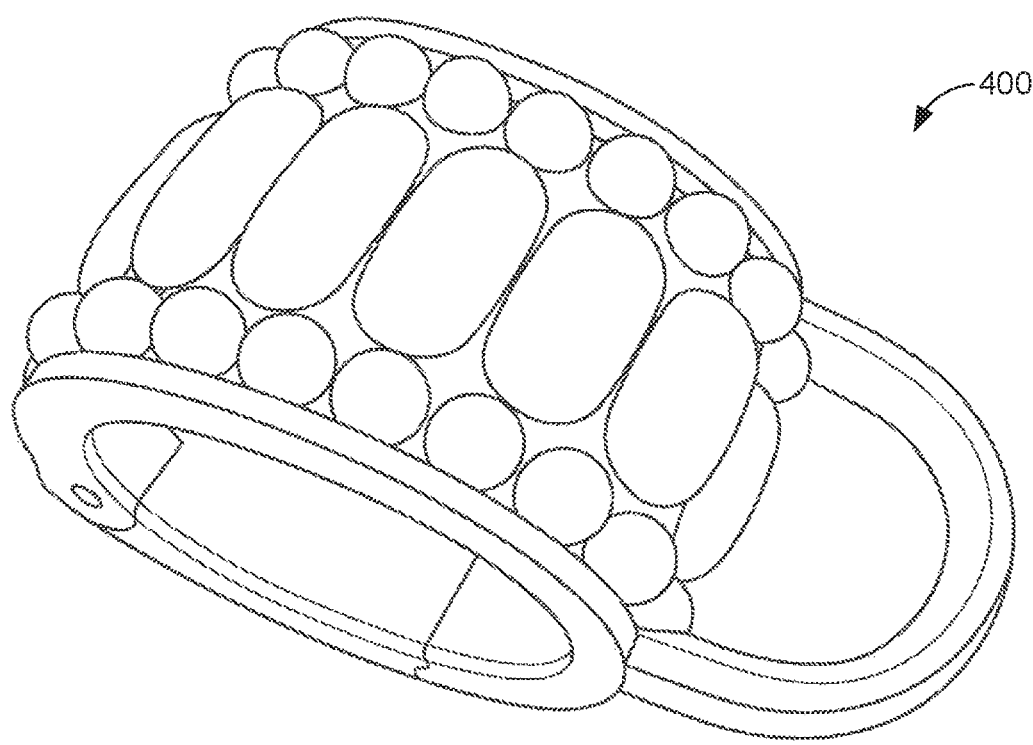
FIG. 10 illustrates a perspective view of the swimsuit jewelry in accordance with an embodiment of the present invention.
Figure 11:
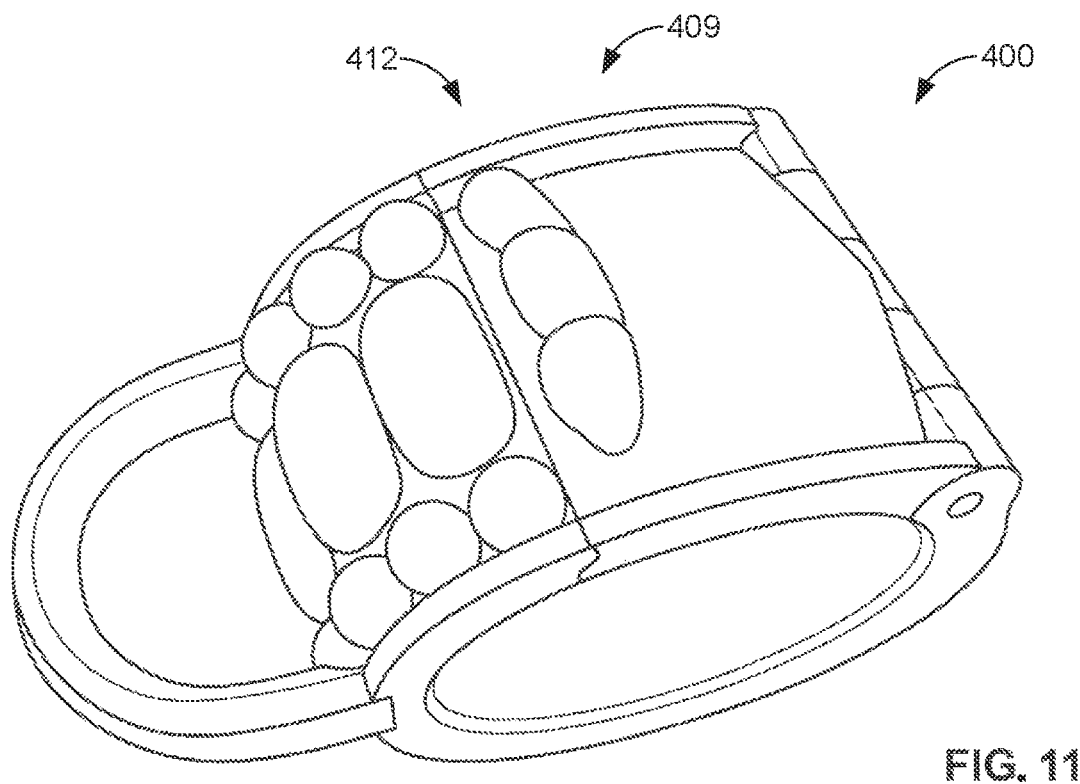
FIG. 11 illustrates a perspective view of the swimsuit jewelry in accordance with an embodiment of the present invention.

FIG. 10 shows the bikini jewelry 400 of FIG. 9 in a slightly different orientation. FIG. 11 is another perspective view of the bikini jewelry 400 showing a tripartite finger latch 412 used to open the clasp 409. As previously discussed, the tripartite finger latch 412 provides more surface area for a user's finger to contact for opening the clasp 409.

Figure 12:
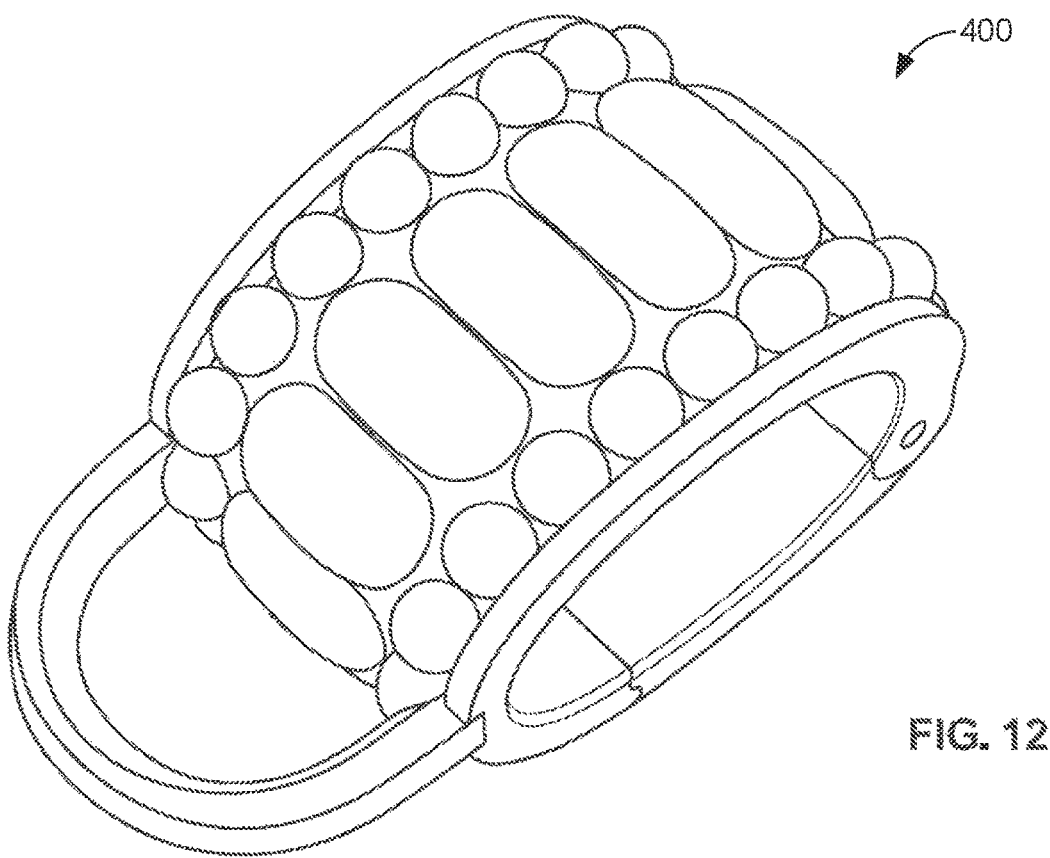
FIG. 12 illustrates a perspective view of the swimsuit jewelry in accordance with an embodiment of the present invention.

FIG. 12 shows the bikini jewelry 400 of FIG. 9 with a chart indicating preferred metal weights of the constituent metals.

Figure 13:
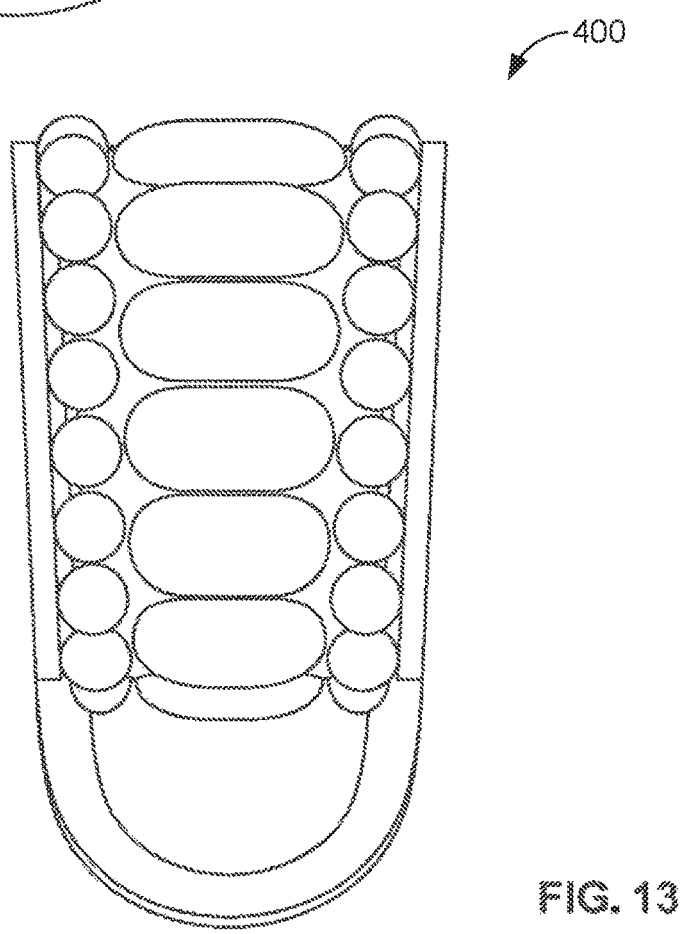
FIG. 13 illustrates a top plan view of the swimsuit jewelry in accordance with an embodiment of the present invention.

FIG. 13 is a top view of the bikini jewelry 400 of FIG. 9 with some preferred dimensions. However, the dimensions shown are intended to be nonlimiting, and any other suitable dimensions may be used.

Figure 14:
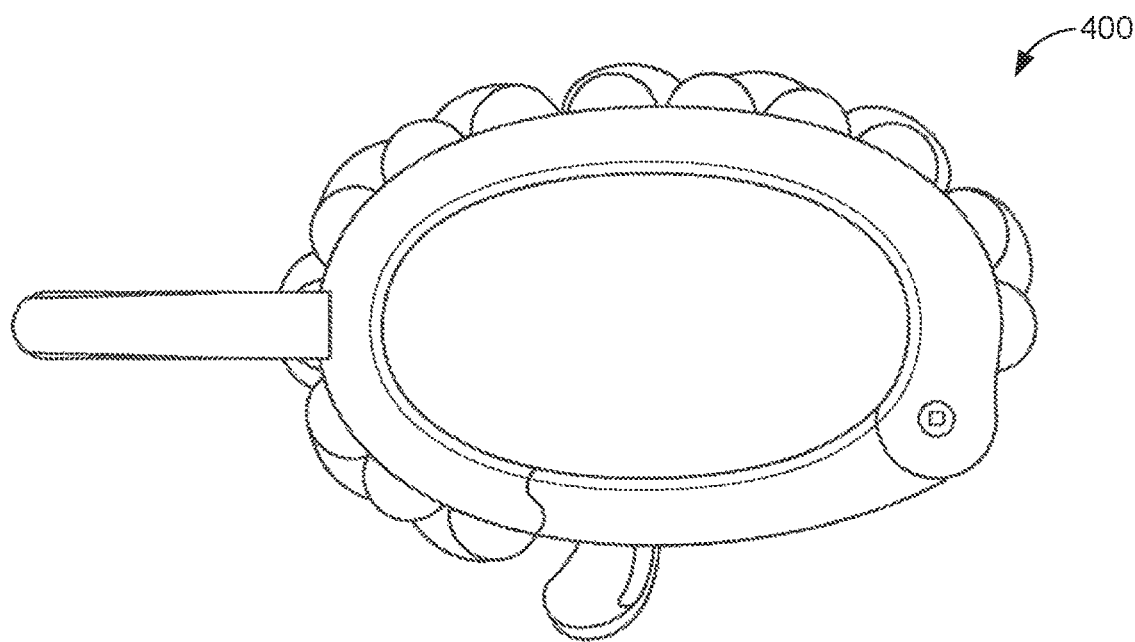
FIG. 14 illustrates a side elevation view of the swimsuit jewelry in accordance with an embodiment of the present invention.
Figure 15:
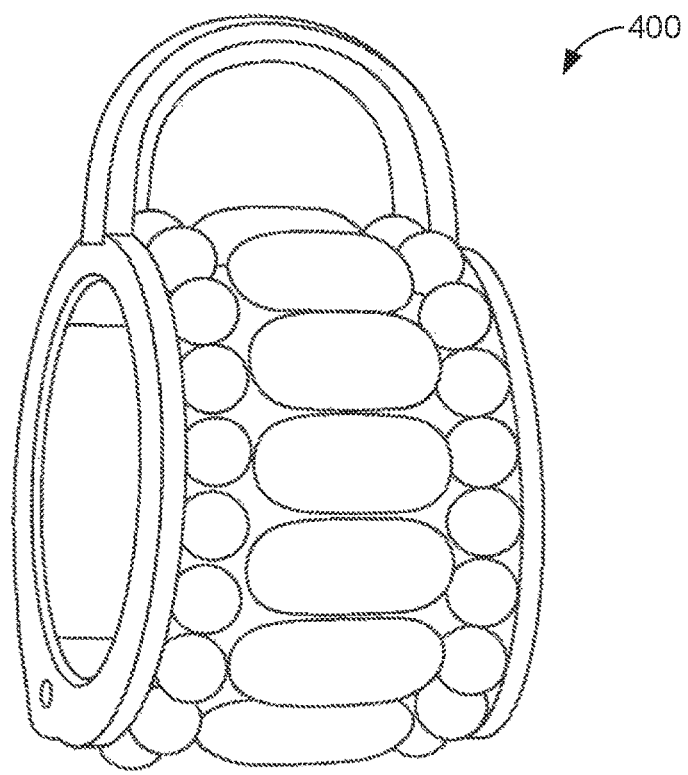
FIG. 15 illustrates a perspective view of the swimsuit jewelry in accordance with an embodiment of the present invention.
Figure 16:
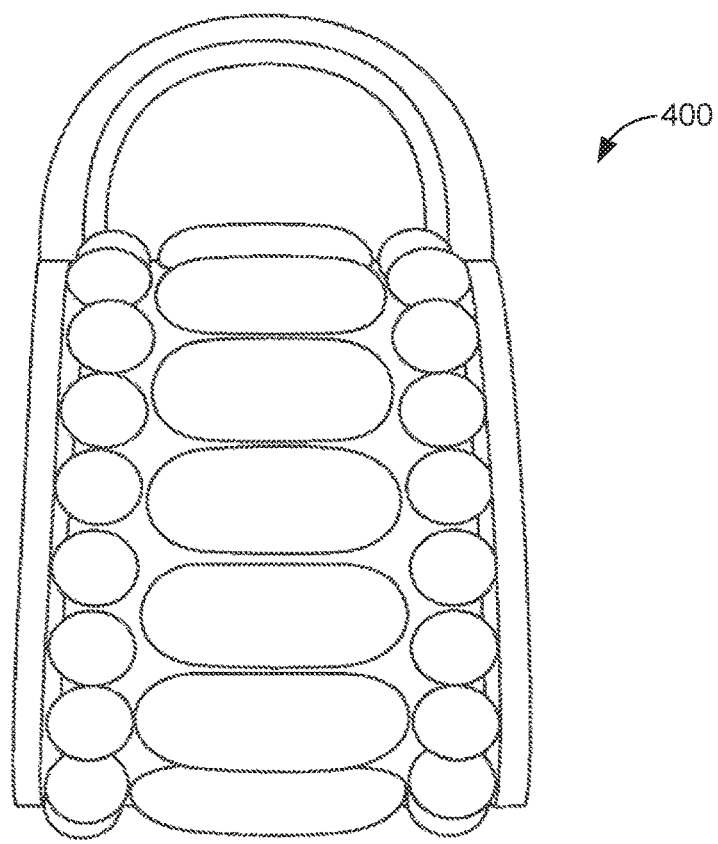
FIG. 16 illustrates a perspective view of the swimsuit jewelry in accordance with an embodiment of the present invention.
Figure 17:
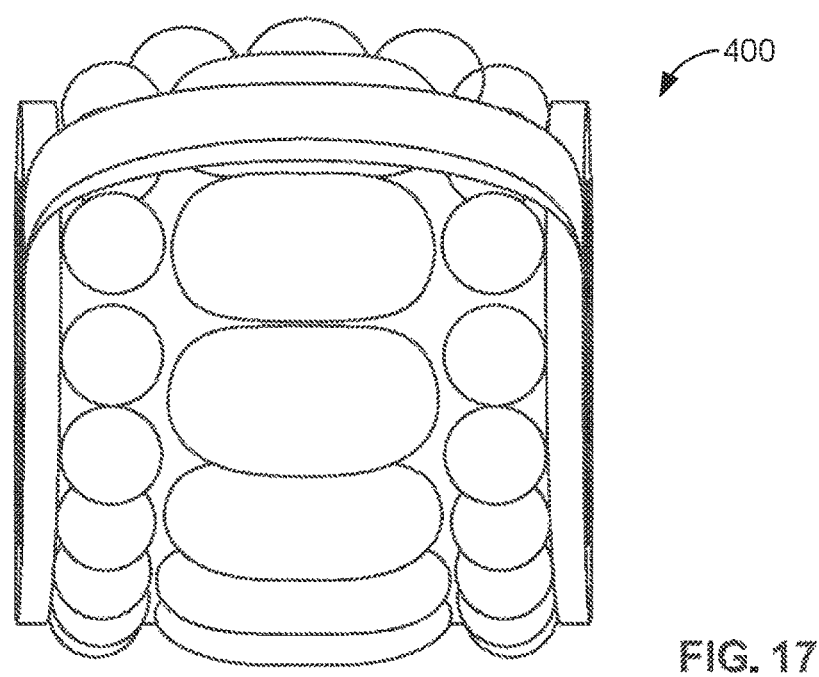
FIG. 17 illustrates a perspective view of the swimsuit jewelry in accordance with an embodiment of the present invention.
Figure 18:
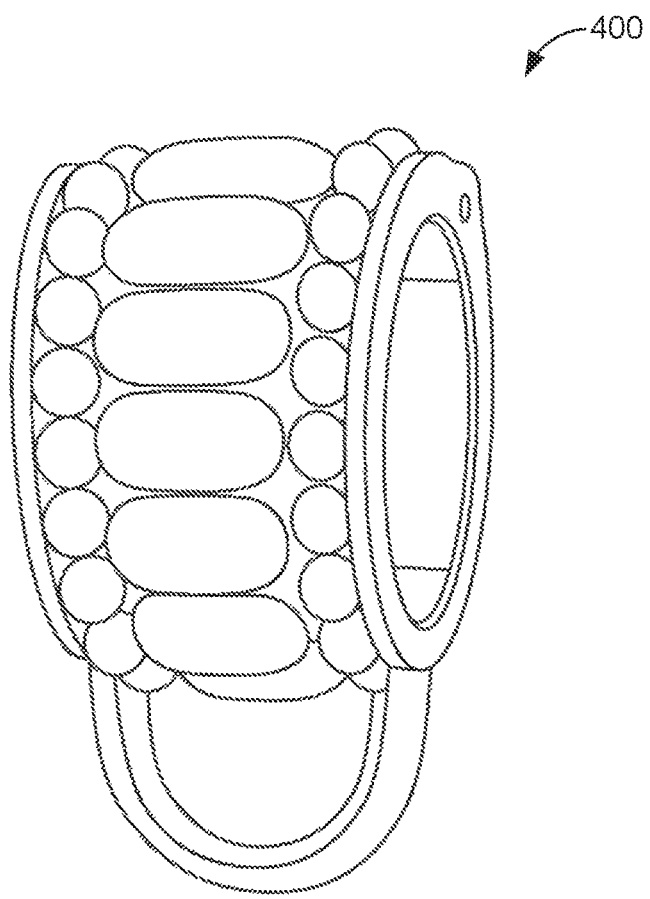
FIG. 18 illustrates a perspective view of the swimsuit jewelry in accordance with an embodiment of the present invention.
Figure 19:
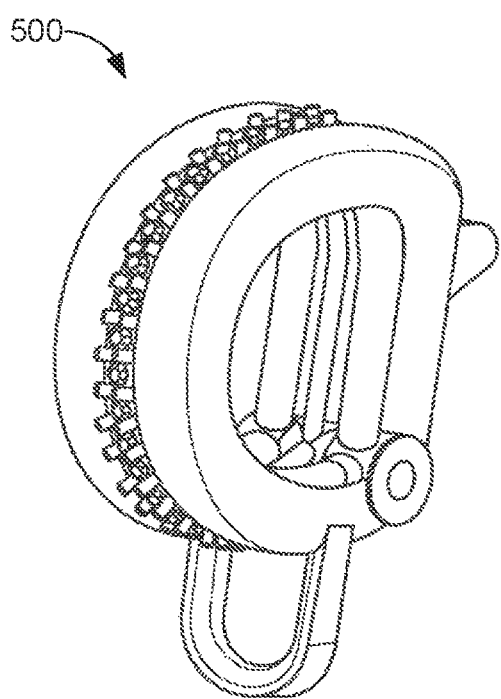
FIGS. 19-21 illustrate perspective, top, and front views, respectively, of a swimsuit jewelry bond in accordance with an embodiment of the present invention.
Figure 20:
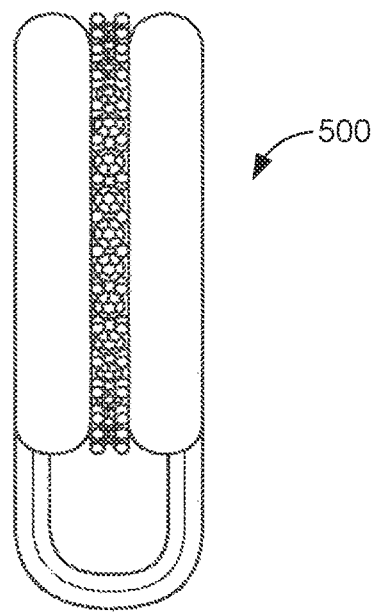
Figure 21:
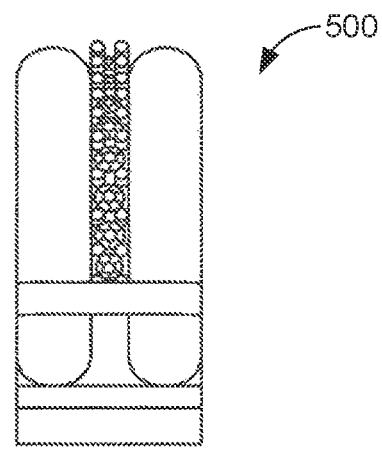
Figure 22:
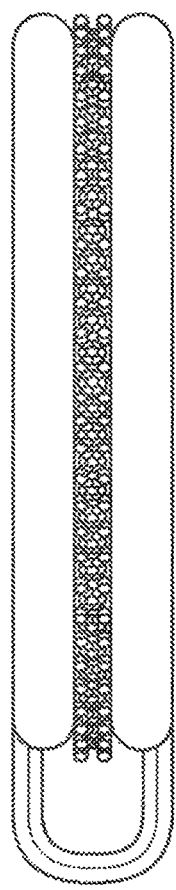
FIGS. 22-24 illustrate top, front, and side views, respectively, of a swimsuit jewelry bond in accordance with another embodiment of the present invention.
Figure 23:
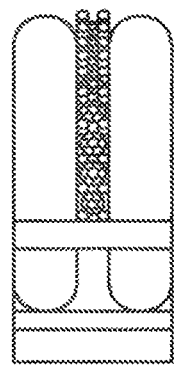
Figure 24:
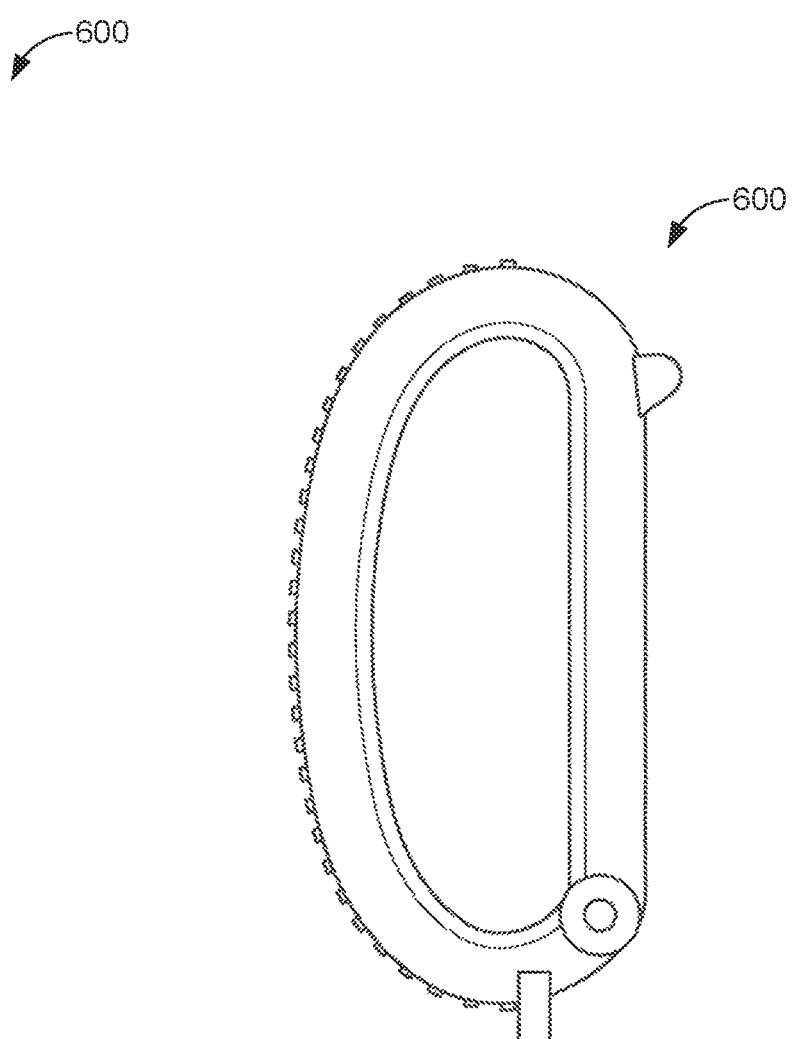
Figure 25:
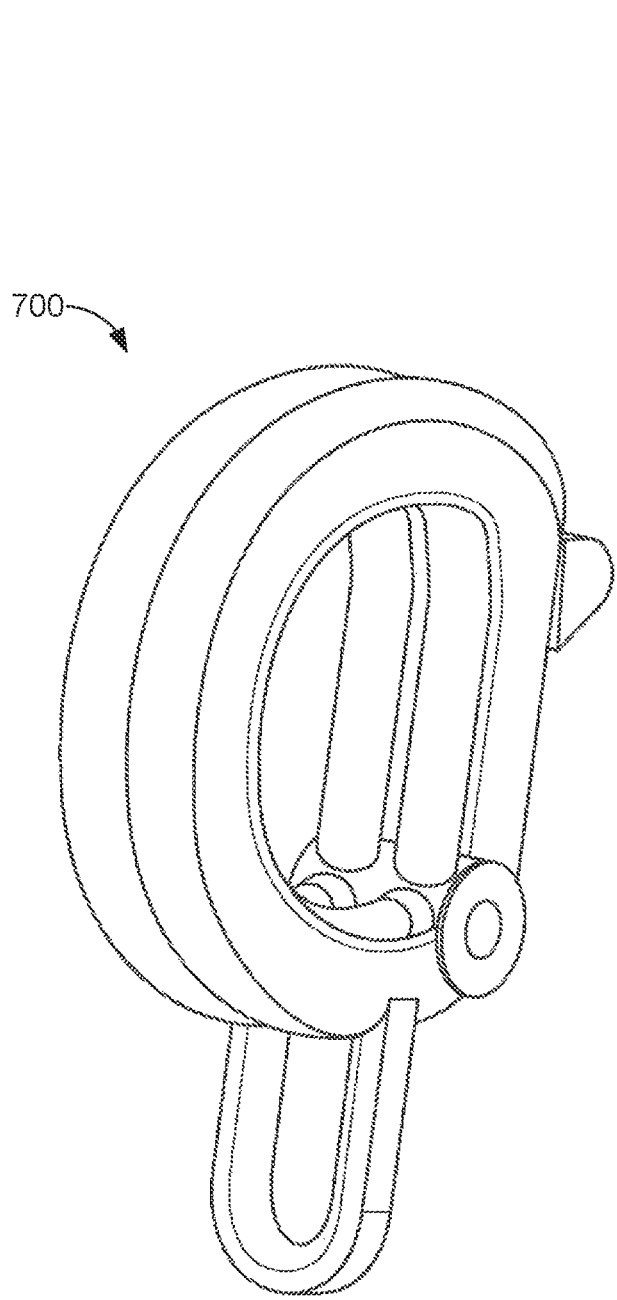
FIGS. 25-27 illustrate perspective, top, and front views, respectively, of a swimsuit jewelry bond in accordance with another embodiment of the present invention.
Figure 26:
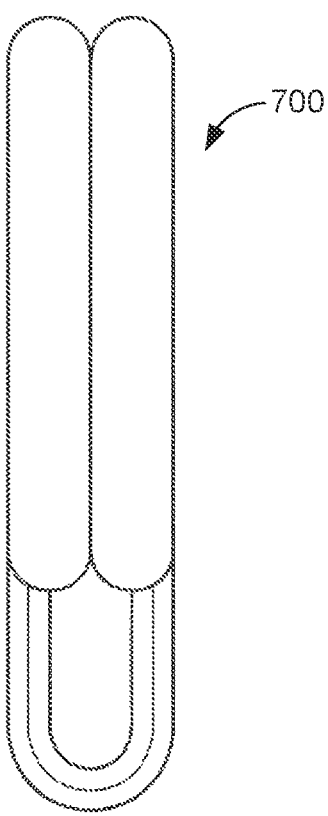
Figure 27:
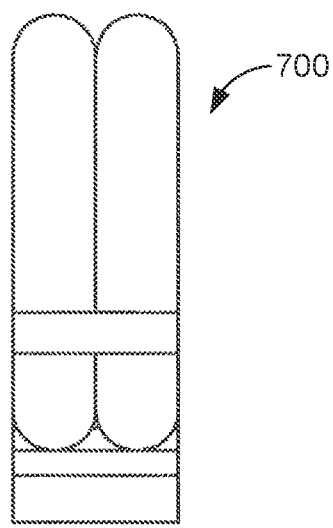
Figure 28:
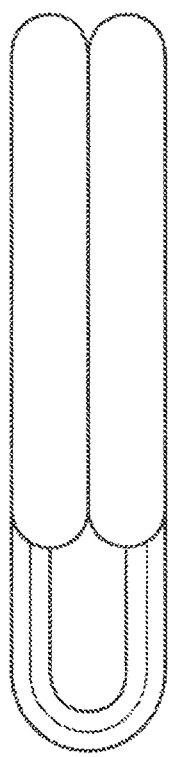
FIGS. 28-30 illustrate top, front, and side views of a swimsuit jewelry bond in accordance with another embodiment of the present invention.
Figure 29:
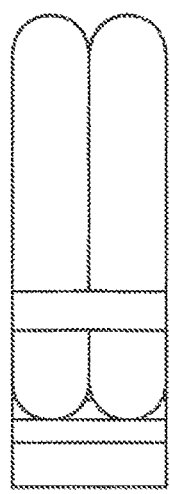
Figure 30:
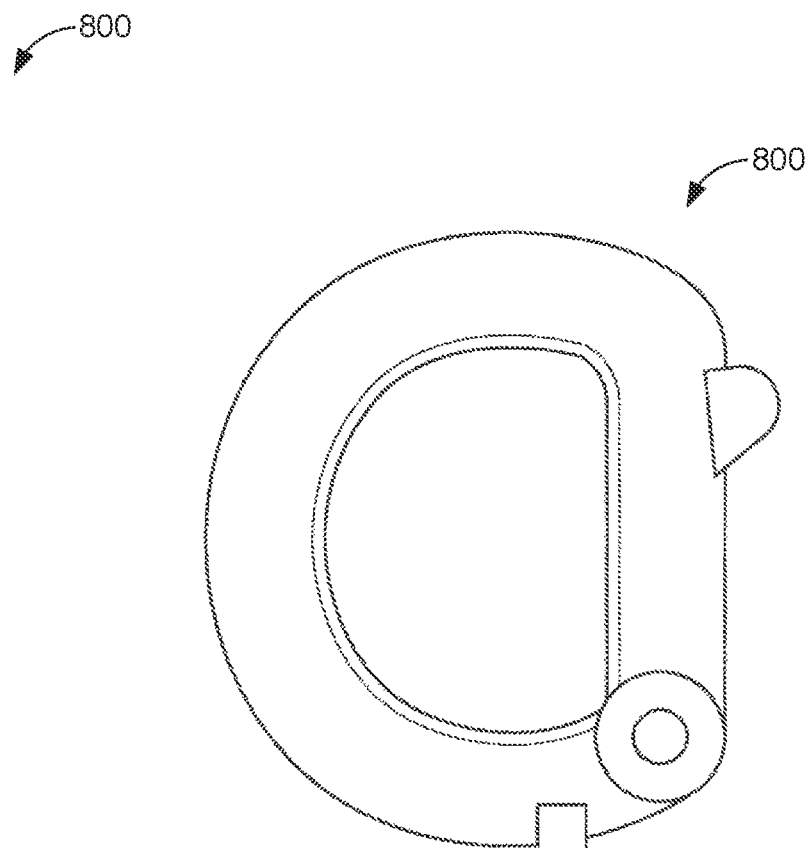
Figure 31:
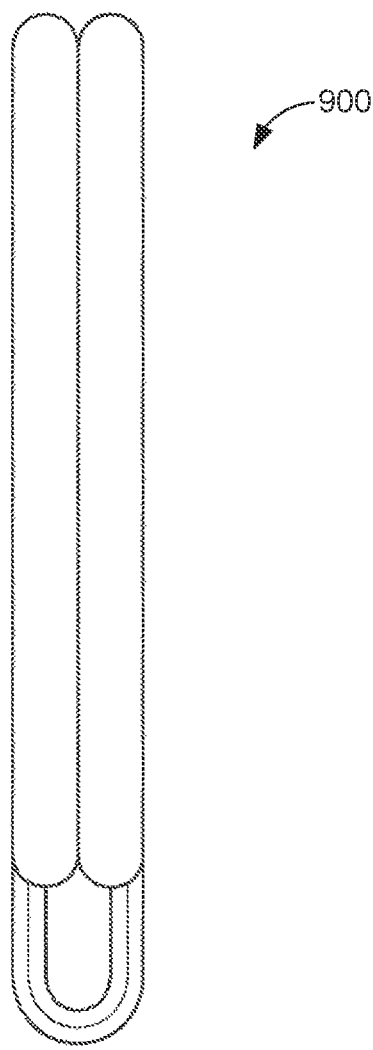
FIGS. 31-35 illustrate top, front, bottom, rear, and side views, respectively, of a swimsuit jewelry bond in accordance with another embodiment of the present invention.
Figure 32:
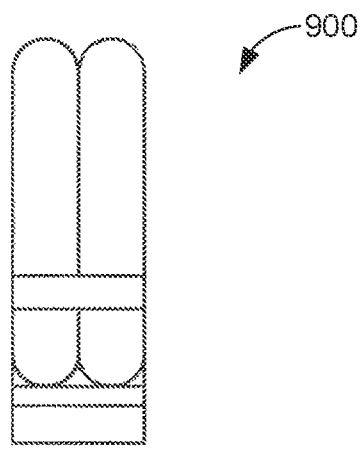
Figure 33:
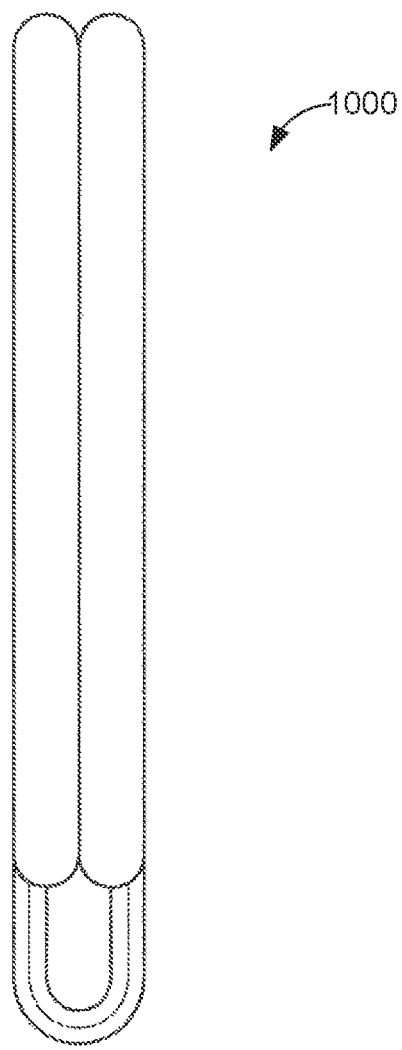
Figure 34:
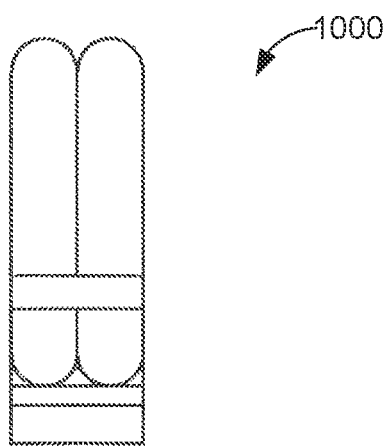
Figure 35:
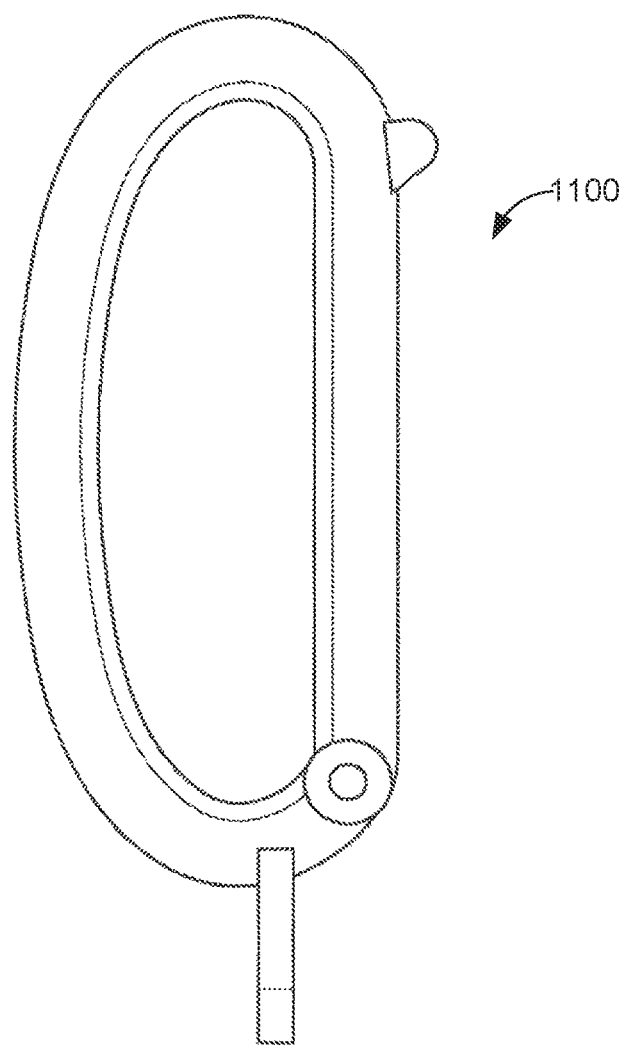
Figure 36:
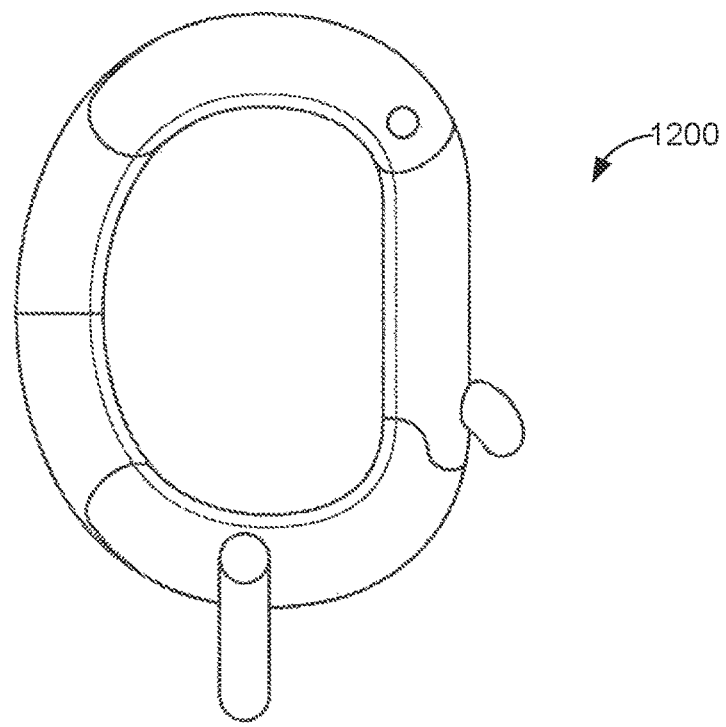
FIGS. 36-37 illustrate a side and perspective view, respectively, of a swimsuit jewelry bond in accordance with another embodiment of the present invention.

FIG. 14 is a side view of the bikini jewelry 400 of FIG. 9 again showing some preferred, but nonlimiting, dimensions.

FIGS. 15-18 show further pictures of the embodiment of the bikini jewelry 400 depicted in FIG. 9.

Figure 57:
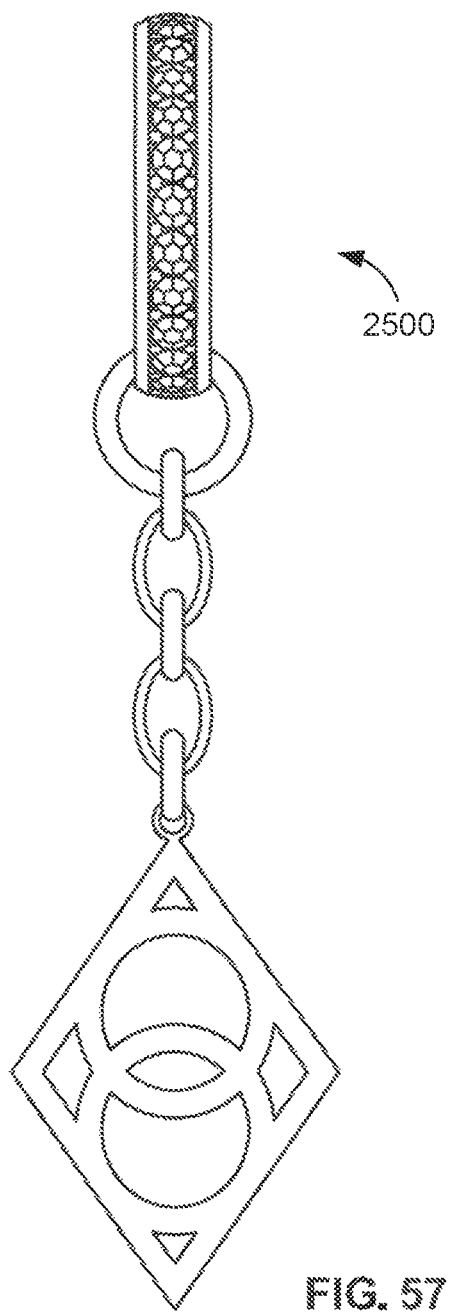
FIGS. 57-58 illustrate a combination of bonds, connectors and charms linked together to form a chain in accordance with embodiments of the present invention.
Figure 58:
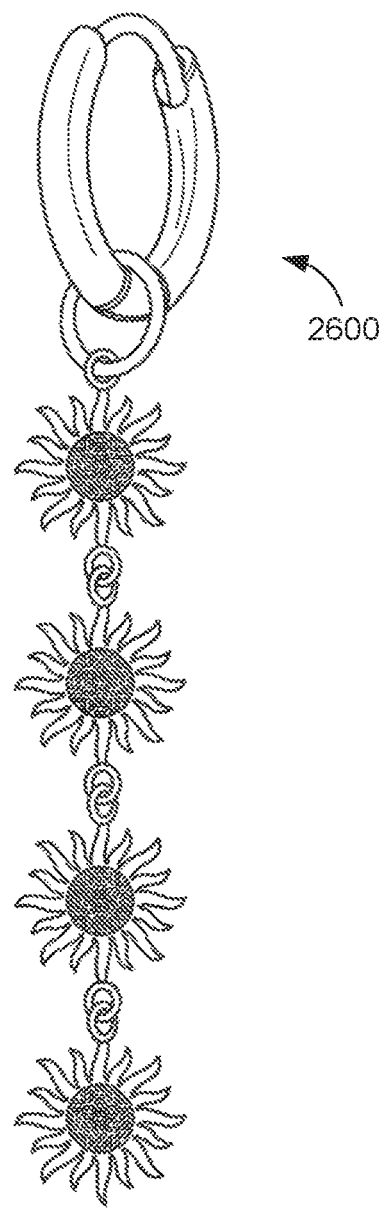

The embodiments described herein can also be linked together to form more ornate designs of bikini jewelry, such as chains, patterns, shapes, and decorations. There are virtually unlimited options for how the swimsuit jewelry can creatively adorn a swimsuit, bikini, or other article to express the user's particular style and taste. For example, FIGS. 19-43 show some exemplary swimsuit jewelry pieces hereinafter referred to as bonds 500-1700 that may be coupled with one or more intermediate pieces hereinafter referred to as connectors 1800-2100 (See FIGS. 44-49) which in turn may be coupled to a terminal piece hereinafter referred to as a charm 2200-2400 (See FIGS. 50-56). The bonds 500-1700, connectors 1800-2100, and charms 2200-2400 may be coupled in any combination and with any number of bonds 500-1700, connectors 1800-2100, and charms 2200-2400 to form decorative chains and patterns 2500 and 2600, as shown for example in FIGS. 57-58, which may be attached to an article such as a swimsuit or bikini.

Figure 37:
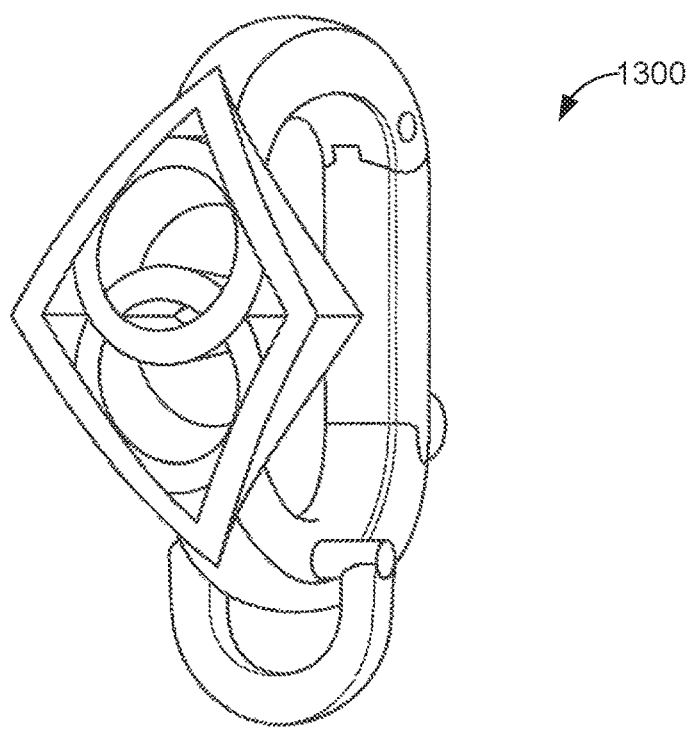
Figure 38:
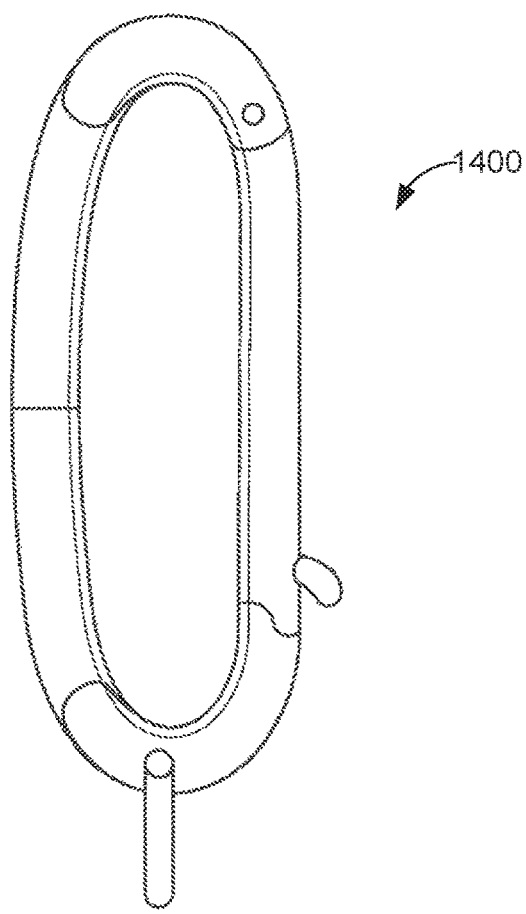
FIGS. 38-39 illustrate a side and perspective view, respectively, of a swimsuit jewelry bond in accordance with another embodiment of the present invention.
Figure 39:
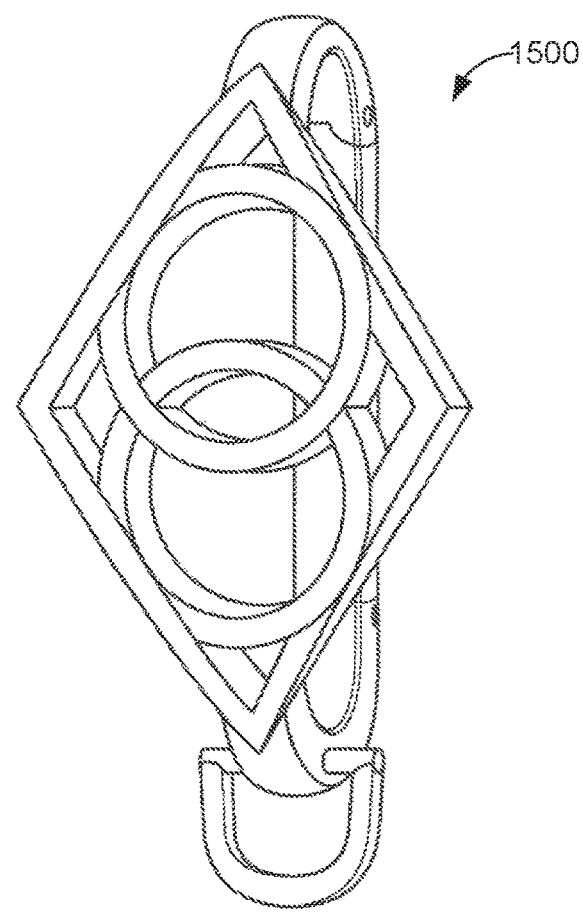
Figure 40:
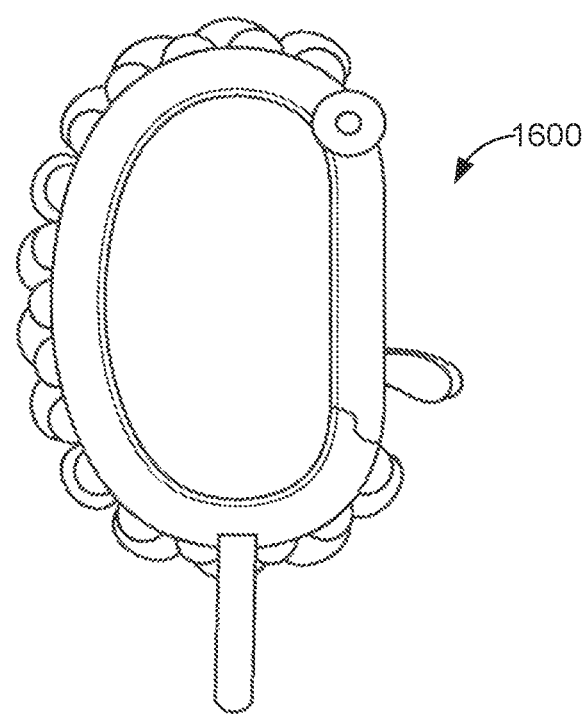
FIGS. 40-41 illustrate a side and perspective view, respectively, of a swimsuit jewelry bond in accordance with another embodiment of the present invention.
Figure 41:
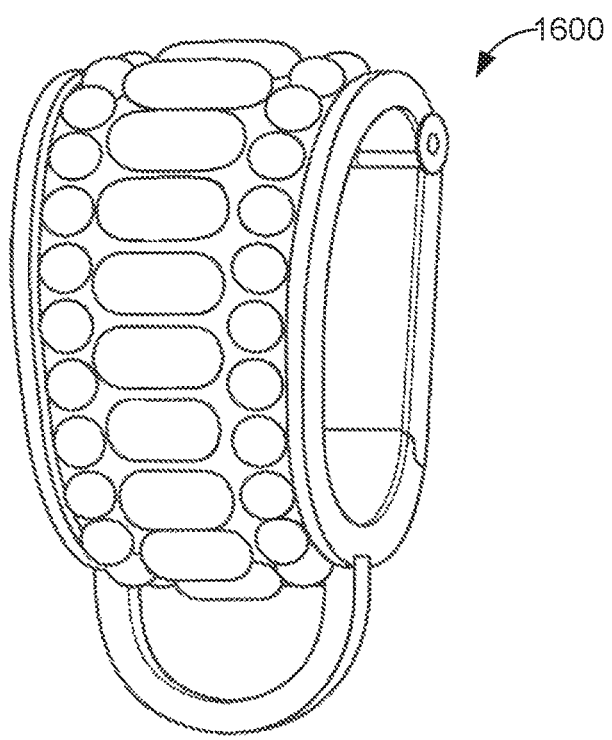
Figure 42:
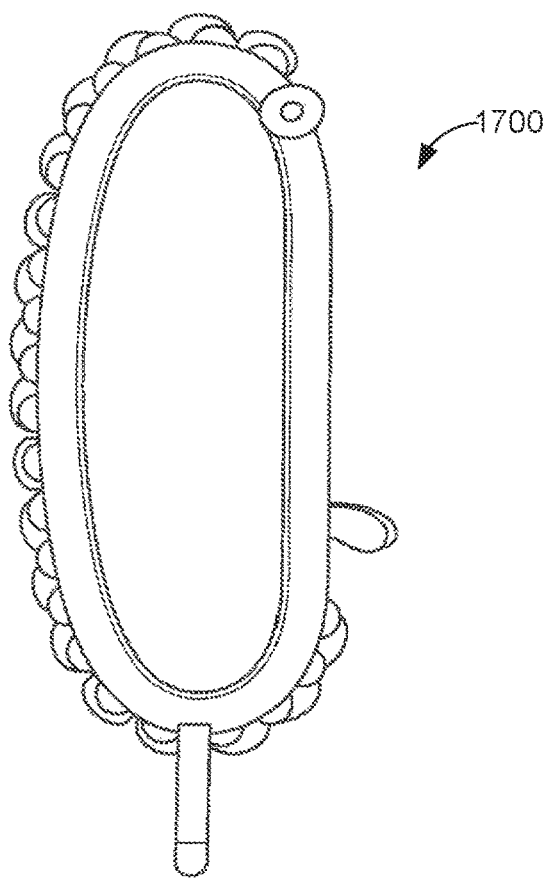
FIGS. 42-43 illustrate a side and perspective view, respectively, of a swimsuit jewelry bond in accordance with another embodiment of the present invention.
Figure 43:
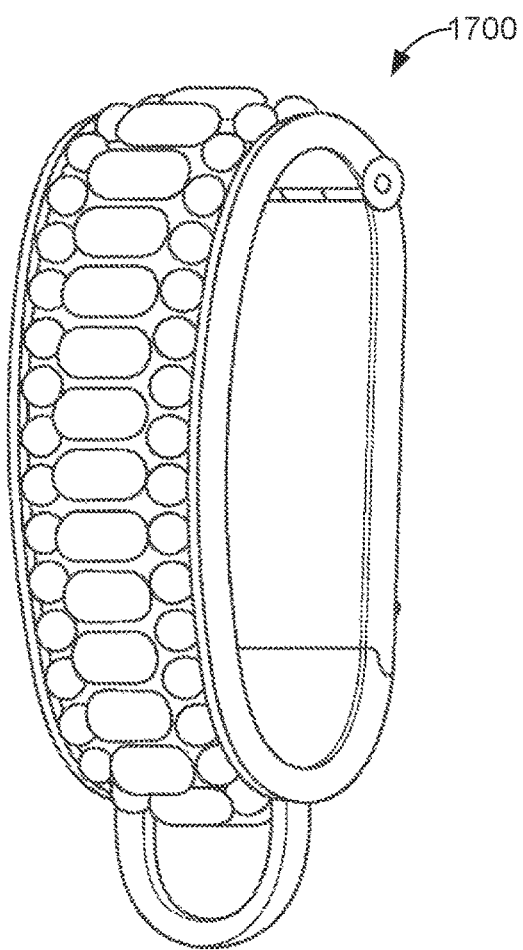
Figure 47:
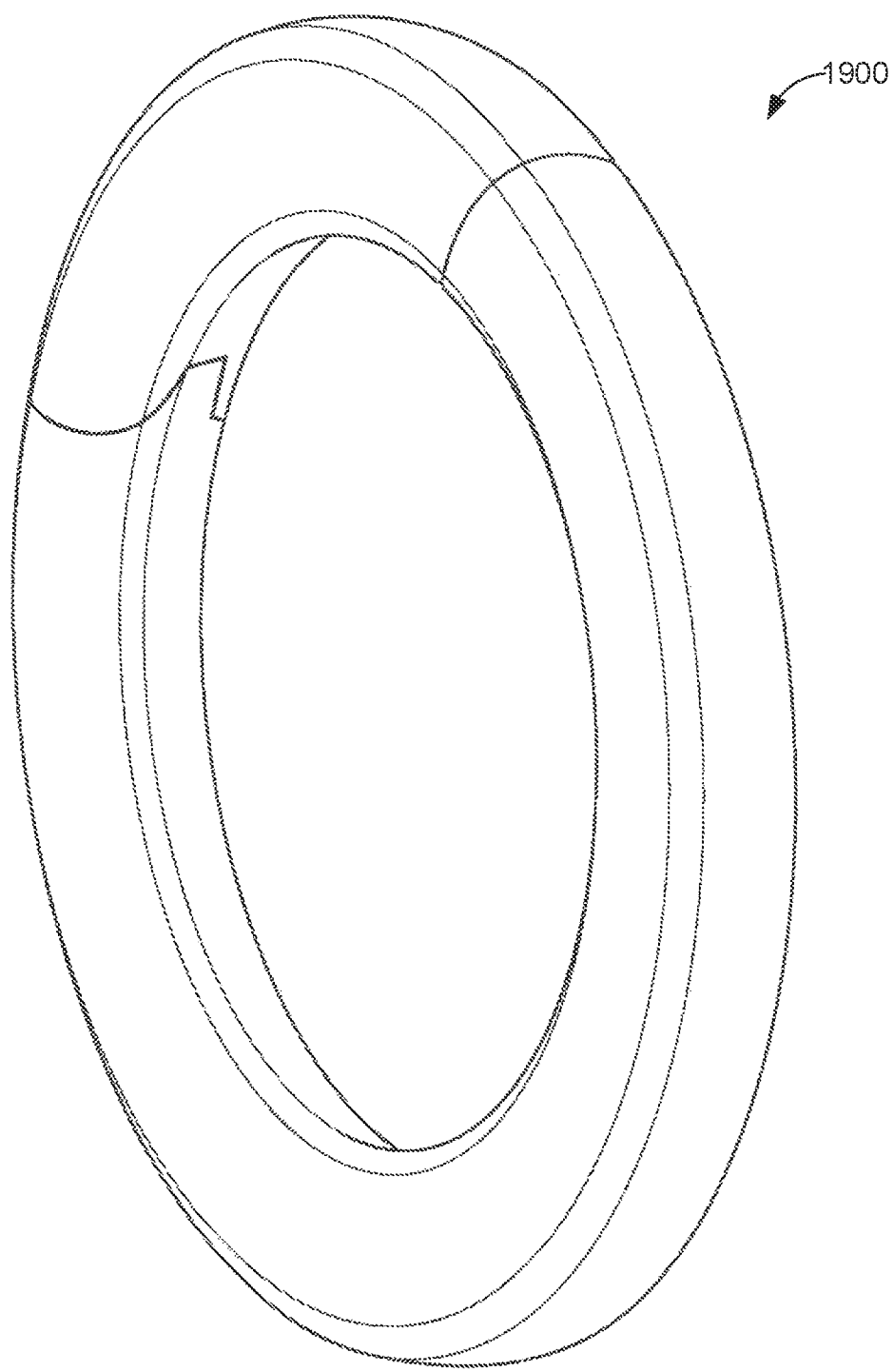
FIG. 47 illustrates a perspective view of a swimsuit jewelry connector in accordance with another embodiment of the present invention.
Figure 48:
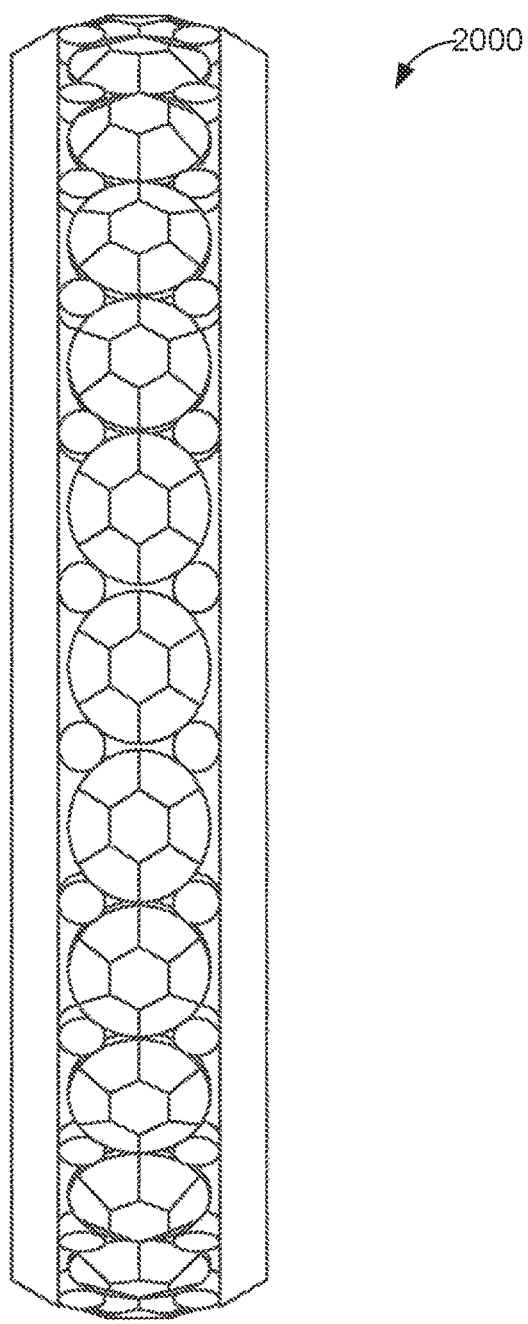
FIG. 48 illustrates a front elevation view of a swimsuit jewelry connector in accordance with another embodiment of the present invention.
Figure 49:
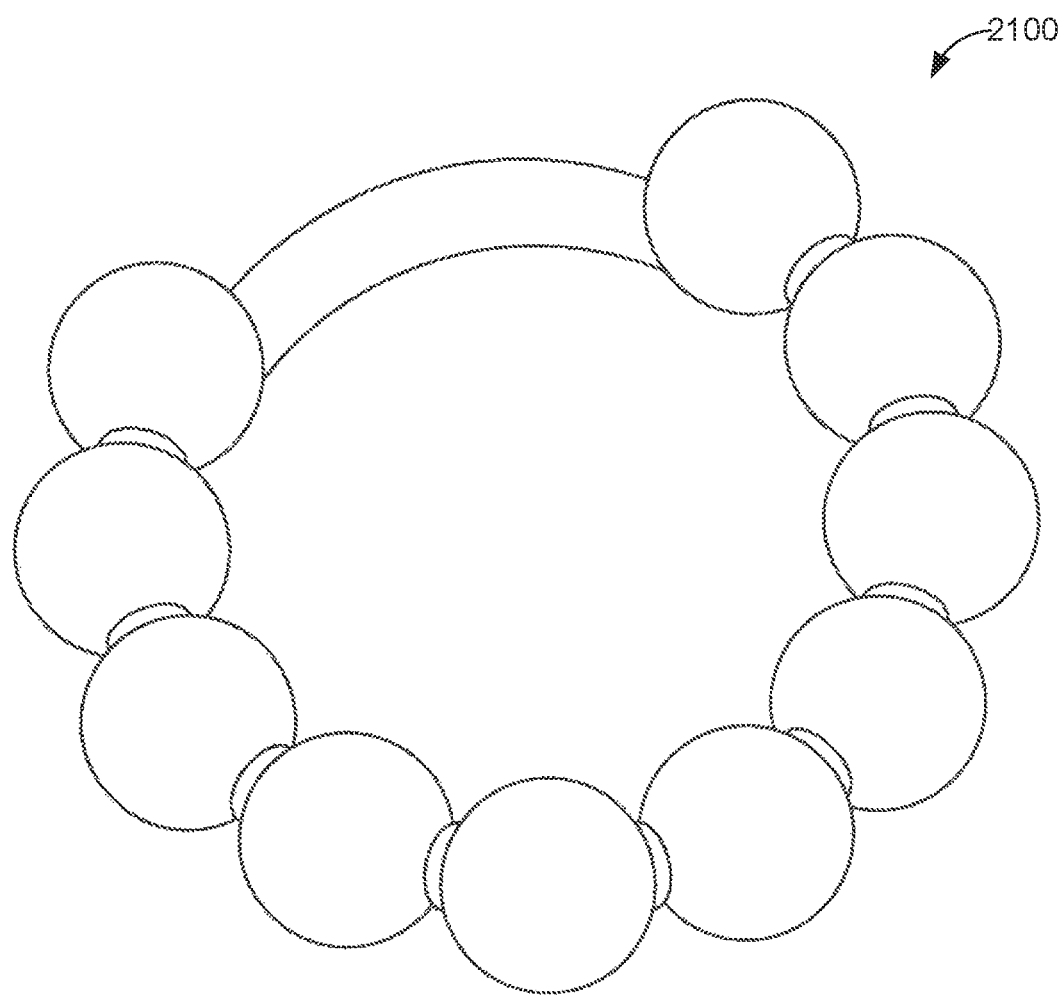
FIG. 49 illustrates a perspective view of a swimsuit jewelry connector in accordance with another embodiment of the present invention.
Figure 50:
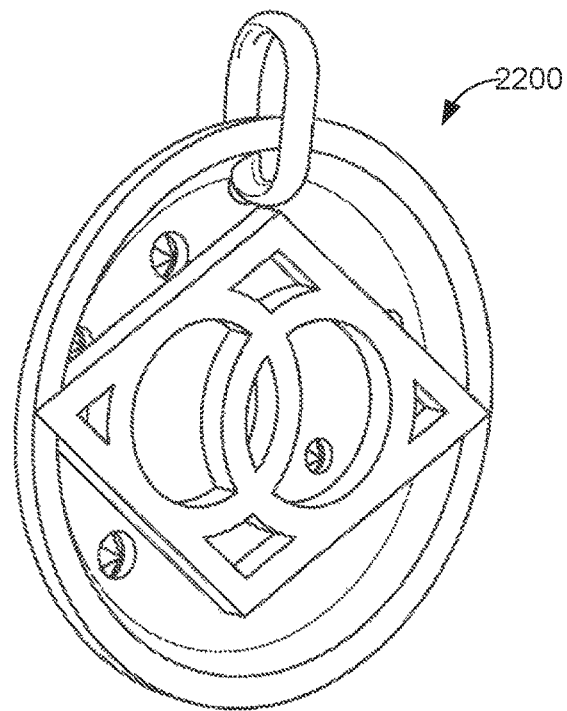
FIGS. 50-52 illustrate perspective, top, and side views, respectively of a swimsuit jewelry charm in accordance with an embodiment of the present invention.
Figure 51:
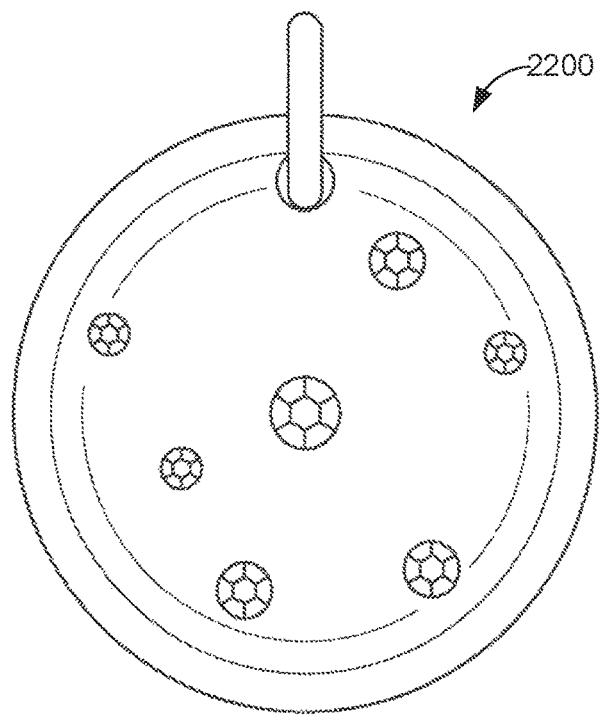
Figure 52:
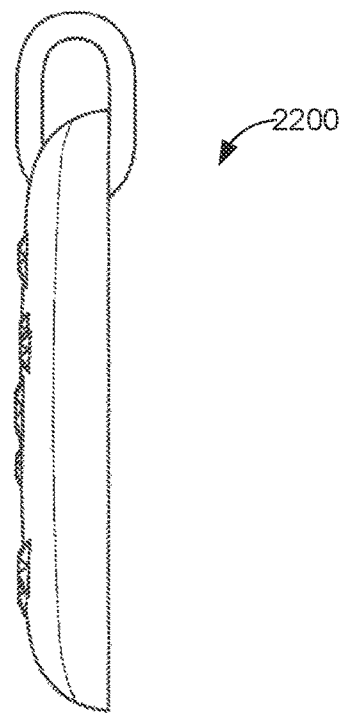
Figure 53:
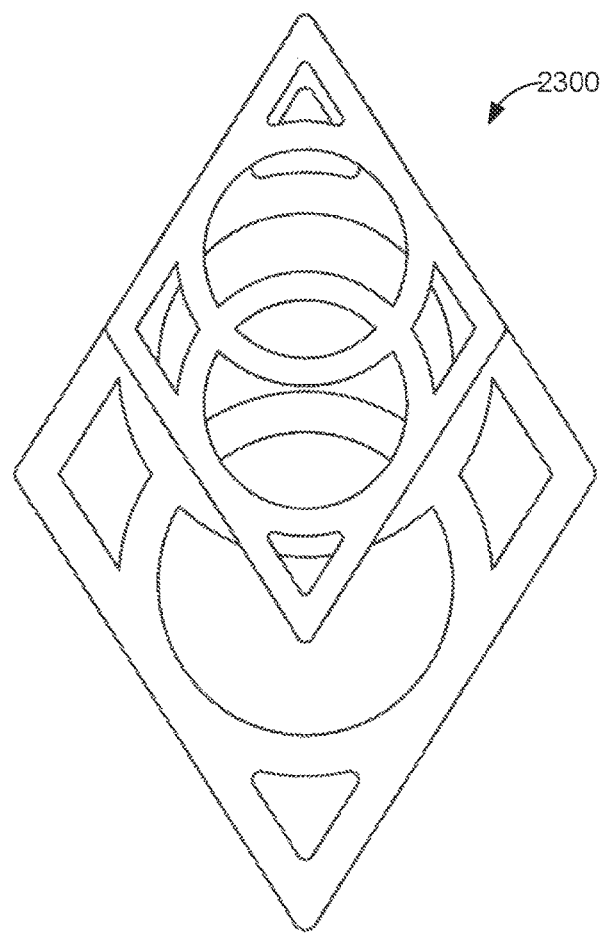
FIG. 53 illustrates a top plan view of a swimsuit jewelry charm in accordance with an embodiment of the present invention.
Figure 54:
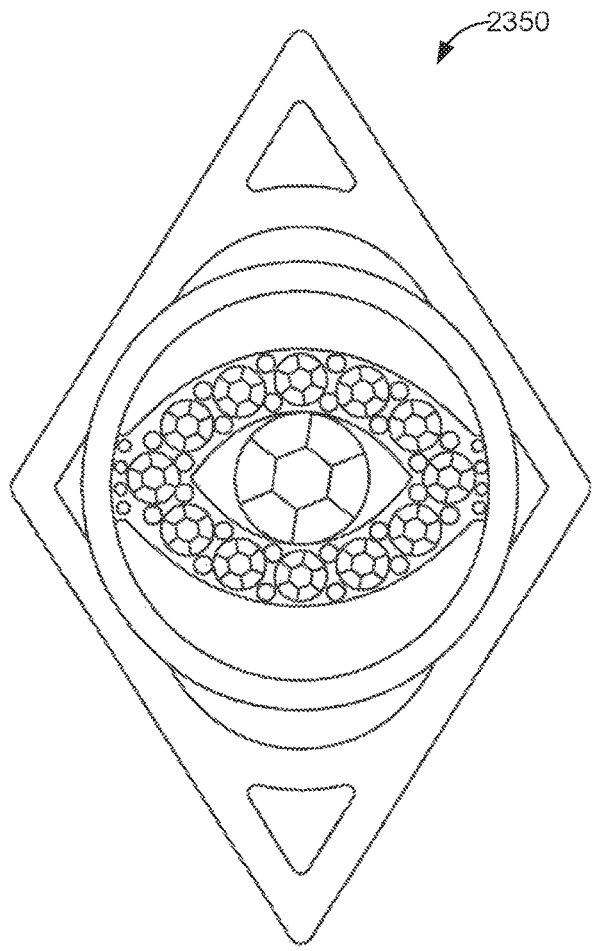
FIG. 54 illustrates a top plan view of a swimsuit jewelry charm in accordance with an embodiment of the present invention.
Figures 55, 56:
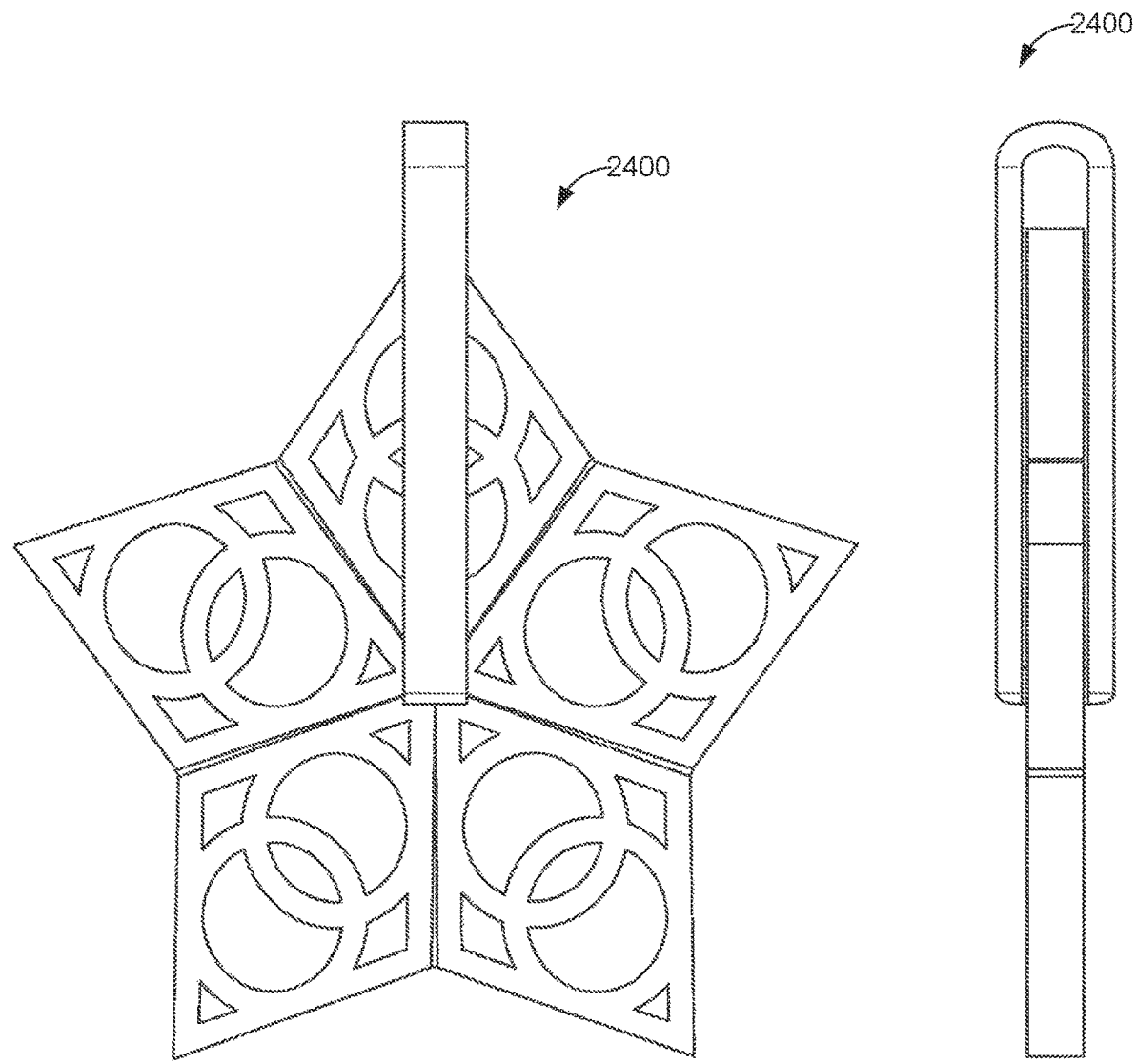
FIGS. 55-56 illustrate top and side views, respectively, of a swimsuit jewelry charm in accordance with embodiments of the present invention.

As can be seen, the bonds 500-1700 include a variety of different decorative designs and shapes such as D-ring, O-ring, or carabiner bonds with or without a studded outer surface as previously described. The bonds 500-1700 may also include one or more embedded jewels or gemstones such as diamonds that may be mounted or embedded in the bond 500-1700 in a variety of different patterns such as a continuous or discontinuous track. The bonds 500-1700 may include a hinged gate, such as a carabiner gate well known in the art. In addition, the bonds 500-1700 may include ornate designs such as linked circles framed within another shape such as a rectangle, parallelogram, or rhomboid as shown in FIGS. 37 and 39.

The connector 1800-2100 may be used as one or more intermediate links in a chain of decorative swimwear jewelry pieces. However, one of ordinary skill in the art will appreciate that connectors 1800-2100 may be the first link, intermediate link, or terminal link in a chain of swimwear jewelry pieces. Accordingly, any order of bonds 500-1700, connectors 1800-2100, and charms 2200-2400 is possible. The connectors 1800-2100 may have a variety of different shapes including circular, elliptical, D-ring, rectangular, polygonal, or any other regular or irregular shape. The connector 1800-2100 may include a spring loaded or simple (i.e., non-spring loaded) hinged gate, such as a carabiner gate well known in the art.

The charm 2200-2400 may be any variety of decorative jewelry pieces that may or may not include a logo. As mentioned above, the charm 2200-2400 may be positioned anywhere in a chain of bonds 500-1700 and connectors 1800-2100 and/or other charms 2200-2400, such as a first, intermediate or terminal piece. Alternatively, the charm 2200-2400, bond 500-1700, or connector 1800-2100 may be worn by itself (i.e., not part of a linked chain). The bonds 500-1700, connectors 1800-2100, and charms 2200-2400 may be specially designed to withstand different conditions or elements, such as saltwater, chlorine, sand, dirt, dust, wind, rain, heat, cold, perspiration, etc. by being waterproof/resistant and corrosion proof/resistant.

Figure 59:
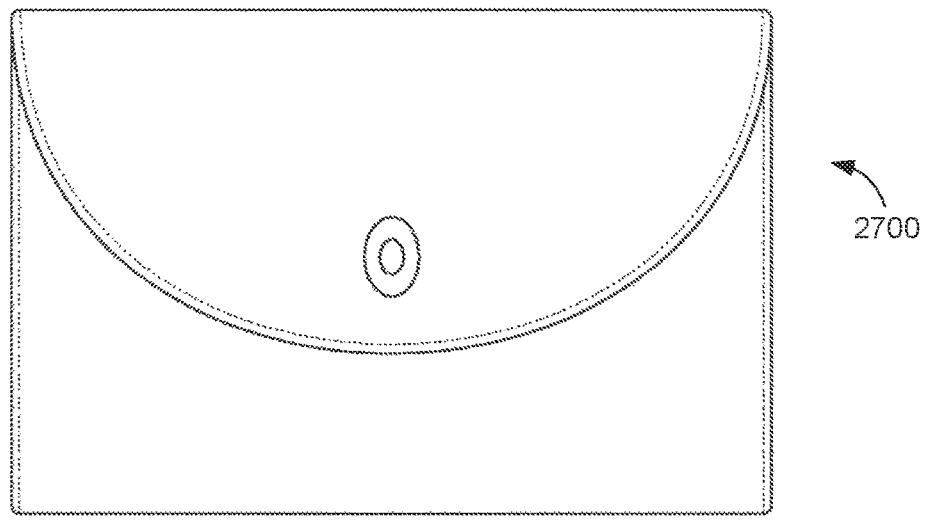
FIGS. 59-61 illustrate pouches for carrying swimsuit jewelry in accordance with an embodiment of the present invention.
Figure 60:
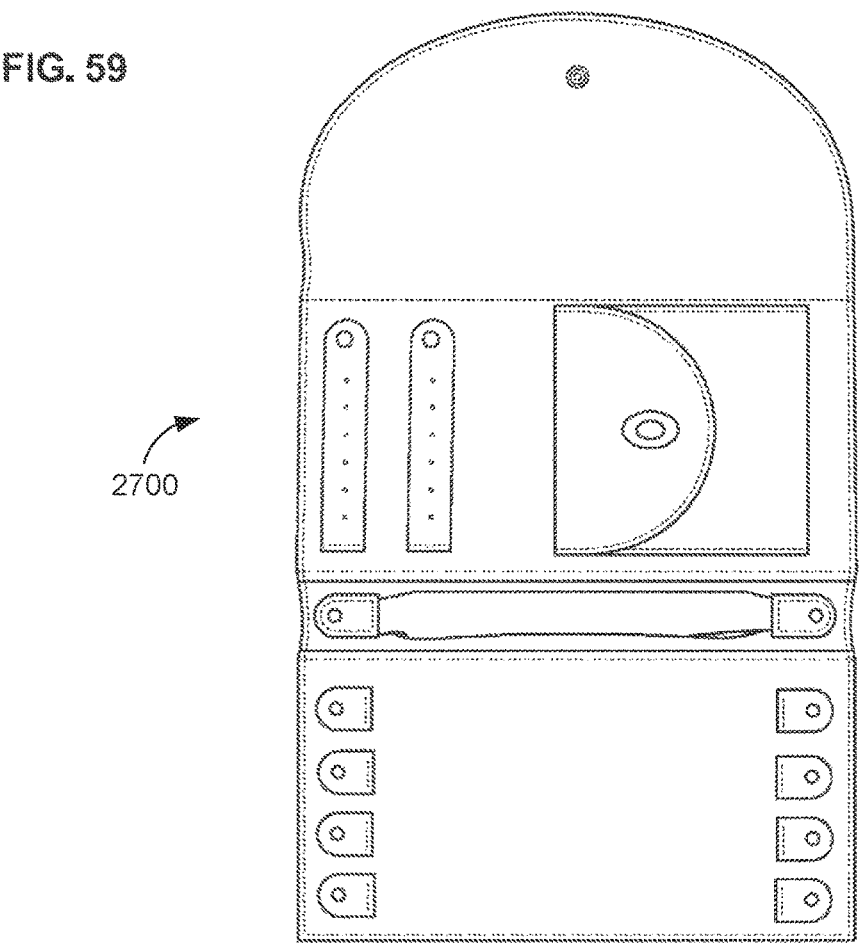
Figure 61:
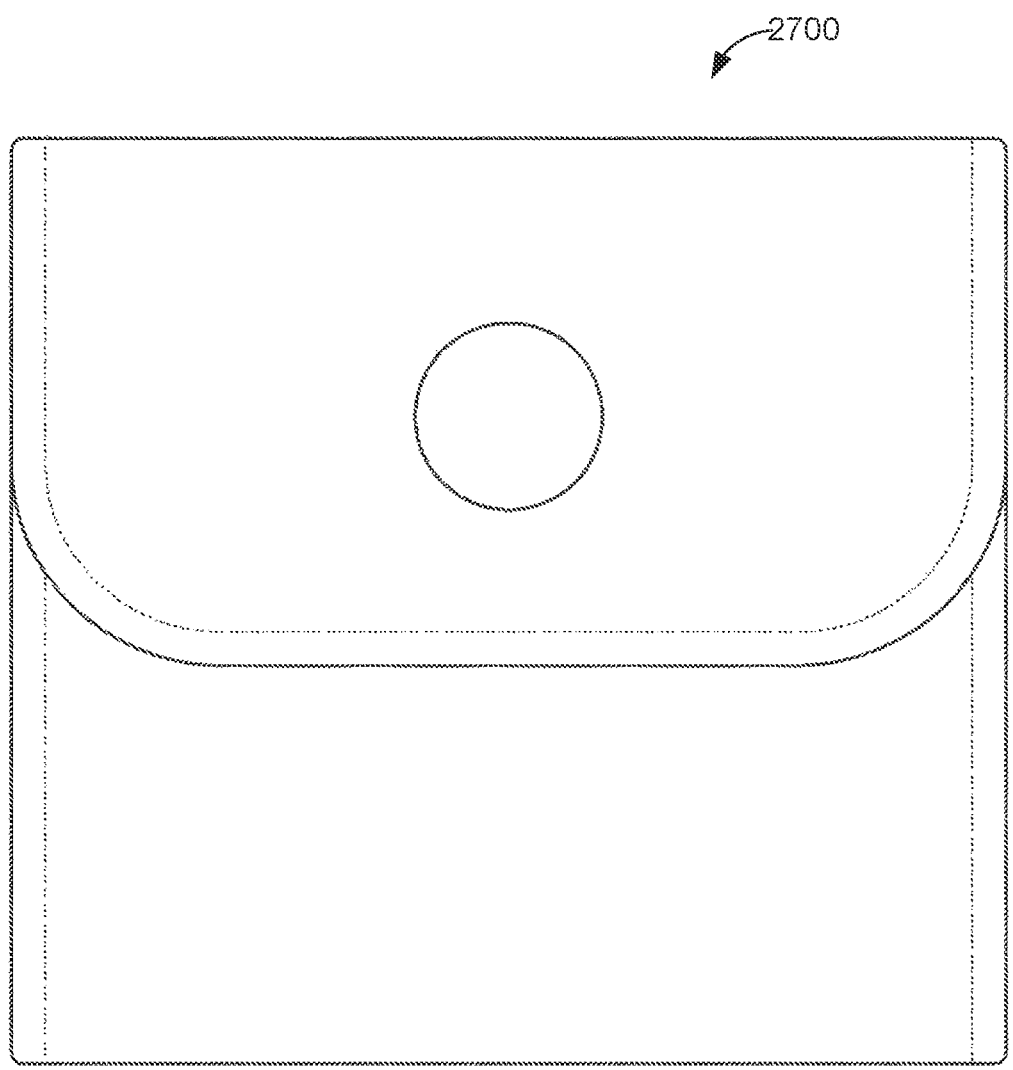

The bonds 500-1700, connectors 1800-2100, and charms 2200-2400 of the present invention may also be organized into kits for attaching to a swimwear article or bikini. The kits may include decorative travel pouches 2700 such as those shown in FIGS. 59-61. The pouches 2700 may come in a variety of different shapes, sizes, and colors.

Numerous modifications and variations to the features of the invention as discussed above, including all equivalents and analogous structures and features which would occur to one of ordinary skill in the art, are intended to fall within the scope of the present invention. For example, alternative configurations swimwear jewelry, including different shapes thereof, or different ways of securing jewelry stones thereto, or providing attachment means therefor, either main or auxiliary, are included within the description of such main member by virtue of present reference thereto.

Furthermore, any various combination or selection of presently disclosed features of the present invention set forth in a given embodiment or construction of swimwear jewelry is included as an embodiment of this invention. Also, the detailed description of the presently preferred embodiments discussed above is intended as words of description only, and not words of limitation, which appear only in the following claims.

What is claimed is:

1. Swimwear jewelry comprising:
   a pair of rings couplable by a pivot mechanism, wherein each ring includes a manually operable clasp for attaching at least one of the rings to part of a bikini; and
   the pivot mechanism comprising:
   a post extending from a first ring of the pair of rings and through an opening on an outer surface of a second ring of the pair of rings;
   a retention donut dimensioned to receive the post extending through an inner surface of the second ring and configured to anchor the post to the inner surface of the second ring; and
   a recessed pocket on the inner surface of the second ring configured to fully receive the retention donut.

2. The swimwear jewelry of claim 1, wherein the second ring clasp comprises a finger latch for opening the clasp.

3. The swimwear jewelry of claim 1, wherein the swimwear jewelry comprises gold, silver, or platinum, or a combination thereof.

4. The swimwear jewelry of claim 3, wherein the swimwear jewelry is comprised of approximately 33.6% gold, 22.6% silver, and 43.7% platinum.

5. The swimwear jewelry of claim 1, wherein one of the pair of rings is a circular ring and an other of the pair of rings is an elliptical ring.

6. The swimwear jewelry of claim 1, wherein one of the pair of rings is smaller than the other of the pair of rings.

7. The swimwear jewelry of claim 1, wherein the second ring comprises a studded outer surface.

8. The swimwear jewelry of claim 7, wherein the studded outer surface comprises two peripheral tracks of spherical studs flanking an inner track of tic-tac shaped studs.

9. The swimwear jewelry of claim 8, wherein the first ring is pivotally attached to the second ring through one of the tic-tac shaped studs.

10. The swimwear jewelry of claim 2, wherein the opening in the second ring defines a passage through one of the tic-tac shaped studs.

11. A swimwear jewelry comprising:
    an elliptical ring comprising a first and second peripheral edges and a manually operable clasp for attaching the elliptical ring to part of an article of swimwear; and
    an arch shaped hook extending substantially radially outward from the elliptical ring and comprising a first end at the first peripheral edge of the elliptical ring and a second end at the second peripheral edge of the elliptical ring.

12. The swimwear jewelry of claim 11, wherein the swimwear jewelry is composed of gold, silver, and platinum.

13. The swimwear jewelry of claim 12, wherein the swimwear jewelry is comprised of approximately 33.6% gold, 22.6% silver, and 43.7% platinum.

14. The swimwear jewelry of claim 11, wherein the clasp comprises a finger latch for opening the clasp.

15. The swimwear jewelry of claim 11, wherein a gate of the manually operable clasp is rotatable about an axis perpendicular to the circumference of the elliptical ring.

16. The swimwear jewelry of claim 15, wherein the elliptical ring comprises a studded outer surface.

17. The swimwear jewelry of claim 16, wherein the studded outer surface comprises two peripheral tracks of spherical studs flanking an inner track of tic-tac shaped studs.

18. Swimwear jewelry comprising:
    a pair of rings couplable by a pivot mechanism, wherein each ring includes a manually operable clasp for attaching at least one of the rings to part of a bikini,
    wherein a smaller ring of the pair of pivotally coupled rings has a circular profile and a larger ring of the pair of pivotally coupled rings has an elliptical profile; and
    the pivot mechanism comprising:
    a post extending from the smaller ring and through an opening on an outer surface of the larger ring;
    a retention donut dimensioned to receive the post extending through an inner surface of the larger ring and configured to anchor the post to the inner surface of the larger ring; and
    a recessed pocket on the inner surface of the larger ring configured to fully receive the retention donut.

19. The swimwear jewelry of claim 18, wherein the swimwear jewelry comprises gold, silver, or platinum, or a combination thereof.

20. The swimwear jewelry of claim 18, wherein the combination is approximately 33.6% gold, 22.6% silver, and 43.7% platinum.

* * * * *